(12) United States Patent
Ise et al.

(10) Patent No.: US 12,413,877 B2
(45) Date of Patent: Sep. 9, 2025

(54) IMAGE SENSOR AND IMAGING APPARATUS

(71) Applicant: CANON KABUSHIKI KAISHA, Tokyo (JP)

(72) Inventors: Makoto Ise, Kanagawa (JP); Isao Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/340,789

(22) Filed: Jun. 23, 2023

(65) Prior Publication Data
US 2023/0421929 A1 Dec. 28, 2023

(30) Foreign Application Priority Data

Jun. 27, 2022 (JP) ................. 2022-102633

(51) Int. Cl.
*H04N 25/79* (2023.01)
*H04N 25/78* (2023.01)
(52) U.S. Cl.
CPC ............. *H04N 25/79* (2023.01); *H04N 25/78* (2023.01)
(58) Field of Classification Search
None
See application file for complete search history.

(56) References Cited

U.S. PATENT DOCUMENTS

| 10,217,785 | B2 | 2/2019 | Izuhara | |
|---|---|---|---|---|
| 10,811,454 | B2 | 10/2020 | Izuhara | |
| 2017/0040371 | A1 | 2/2017 | Izuhara | |
| 2019/0189666 | A1 | 6/2019 | Izuhara | |
| 2019/0288023 | A1* | 9/2019 | Raynor | ................. H10F 39/811 |
| 2020/0403020 | A1 | 12/2020 | Izuhara | |
| 2021/0006740 | A1* | 1/2021 | Shimura | .............. H04N 25/671 |
| 2021/0067721 | A1* | 3/2021 | Wakashima | ........... H04N 25/78 |

FOREIGN PATENT DOCUMENTS

JP  6245474 B2  12/2017

* cited by examiner

*Primary Examiner* — Mark T Monk
(74) *Attorney, Agent, or Firm* — Canon U.S.A., Inc. IP Division

(57) ABSTRACT

An image sensor including a first signal processing circuit including a first ramp signal generation circuit and a first analog-to-digital (AD) conversion circuit, a second signal processing circuit including a second ramp signal generation circuit and a second AD conversion circuit, and wiring connected so that a first ramp signal output from the first ramp signal generation circuit is supplied to the first and second AD conversion circuits, and a second ramp signal output from the second ramp signal generation circuit is supplied to the first and second AD conversion circuits.

6 Claims, 19 Drawing Sheets

IMAGE SENSOR AND IMAGING APPARATUS

BACKGROUND

Field of the Disclosure

The present disclosure relates to an image sensor and an imaging apparatus.

Description of the Related Art

There is a layered image sensor technology for forming a pixel chip of a complementary metal-oxide-silicon (CMOS) image sensor by a backside process to improve the degree of freedom of layout of pixel reading circuits and laminating the pixel chip with a separately formed logic chip to improve read processing speed. Logic chips of layered image sensors have recently been increasing in the number of paths of digital signal processing circuits or incorporating large-capacity memories, and the layered image sensors have been advancing significantly in processing performance.

For imaging capabilities of even higher image quality, imaging apparatuses, such as a digital camera, are getting larger in the imaging lens diameter. Layered image sensors, such as 35-mm full-size CMOS image sensors, are also being actively developed.

Meanwhile, semiconductor exposure systems for manufacturing layered image sensors are not capable of exposing mask patterns for a large-area chip, such as a full-size CMOS image senor, by a single shot of exposure due to limitations in the resolving ranges and resolutions of the mask patterns. Thus, split exposure with two separate shots is to be performed. In particular, the logic chip of a full-size layered CMOS image sensor is to be manufactured using split exposure with priority given to exposure resolution for the sake of faster speed and lower power. It follows that digital circuits and memories of the same specifications are redundantly formed in both the left and right parts of the chip.

Some functional circuits supposed to be usable in common can thus be redundantly formed in the left and right parts of the chip, resulting in a redundant circuit configuration. To operate both of the redundant circuits is power-wasting. In view of such circumstances, Japanese Patent No. 6245474 discusses the provision of a control unit that enables and disables functions of the respective functional circuits separately in the left and right parts of the chip formed by split exposure. If a function can be implemented by operating a functional circuit in either part, one of the functional circuits is enabled and the other is disabled to avoid wasting power.

Even if the left and right parts include the same functional circuits, analog signals processed between the left and right signal processes may be inconsistent due to a difference in the characteristics of the left and right functional circuits. For example, if left and right analog-to-digital (AD) conversion circuits have a difference in linearity characteristics, digital image signals generated by the left and right AD conversion circuits may be different in tone and cause image noise. Some of the functional circuits usable in common are therefore desirably shared between the left and right digital circuits to avoid inconsistency between the analog signals generated in the left and right parts.

However, while Japanese Patent No. 6245474 discusses enabling either one of the same functional circuits in the left and right parts and disabling the other, a specific use method for avoiding inconsistency that occurs if the same functional circuits are not shared between the left and right parts is not mentioned.

To add a new circuit function to a chip formed by split exposure doubles the circuit scale inside the chip. The redundant circuits can impair the accommodation efficiency of circuits in the chip and hinder the addition of new circuits, which is unable to be solved by the foregoing prior art.

If either one of redundant functional circuits is enabled and the other is disabled between the split exposure areas of the layered image sensor, the left and right parts are difficult to uniformize in power consumption since the functional operations are different. In other words, the split exposure areas can be different in the amount of heat generation, and the pixel chip stacked thereon can vary in the temperature dependence characteristic (dark current noise).

SUMMARY

Some embodiments of the present disclosure are directed to improving a circuit layout efficiency in a logic chip and make effective use of redundant functional circuits while maintaining consistency of analog signals in respective split exposure areas of an image sensor including a pixel chip and the logic chip stacked on each other. Some embodiments of the present disclosure are also directed to providing an image sensor with further reduced power consumption and reduced occurrence of differences in the amount of heat generation from one split exposure area to another within the logic chip.

According to an aspect of the present disclosure, an image sensor includes a pixel chip including a plurality of unit pixels arranged in a matrix, a logic chip including a first signal processing circuit and a second signal processing circuit formed by split exposure, the pixel chip and the logic chip being stacked on each other, the first signal processing circuit including a first ramp signal generation circuit and a first analog-to-digital (AD) conversion circuit, the second signal processing circuit including a second ramp signal generation circuit and a second AD conversion circuit, and wiring connected so that a first ramp signal output from the first ramp signal generation circuit is supplied to the first and second AD conversion circuits, and a second ramp signal output from the second ramp signal generation circuit is supplied to the first and second AD conversion circuits.

Further features of various embodiments will become apparent from the following description of exemplary embodiments with reference to the attached drawings.

DESCRIPTION OF THE EMBODIMENTS

Exemplary embodiments of the present disclosure will be described in detail below with reference to the accompanying drawings.

An imaging apparatus according to an exemplary embodiment of the present disclosure will initially be outlined below with reference to FIGS. 1 to 7.

Figure 1:
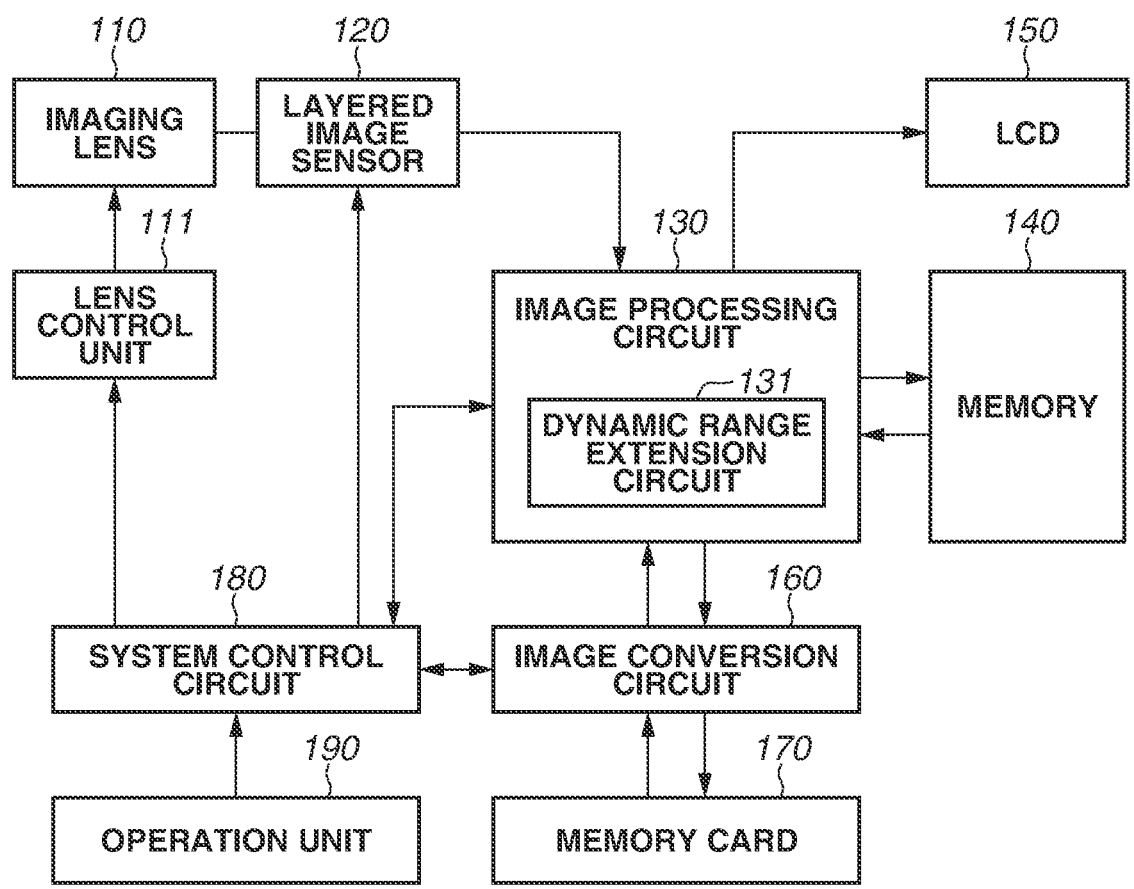
FIG. 1 is a block diagram illustrating an imaging apparatus.

FIG. 1 is a block diagram illustrating a configuration of the imaging apparatus according to the present exemplary embodiment. The configuration of FIG. 1 will initially be described.

An imaging lens 110 includes a plurality of lens groups, such as a focus lens and a zoom lens, and a diaphragm mechanism. A lens control unit 111 controls the focusing, zooming, and aperture of the imaging lens 110 under control of a system control circuit 180.

A layered image sensor 120 is a complementary metal-oxide-semiconductor (CMOS) sensor that generates charges based on the amount of incident light by photoelectric conversion, performs analog-to-digital (AD) conversion, and outputs the resulting digital image signal. Aside from the reading of signals from all the pixels, the layered image sensor 120 is also capable of reading of charges while specific pixels are added and certain rows or columns are dropped from reading.

The image signal output from the layered image sensor 120 is taken into an image processing circuit 130 including a dynamic range extension circuit 131. The dynamic range extension circuit 131 has a function of generating a dynamic range-extended image using a high exposure image and a low exposure image stored in a memory 140 in advance.

The image processing circuit 130 performs various types of signal processing, including gamma processing, color signal processing, and exposure correction processing. The image processing circuit 130 also performs image magnification processing for enlarging and reducing an image based on zoom operations, in other words, electronic zoom processing. Here, the image processing circuit 130 performs image signal write and read processing with the memory 140. The output of the image processing circuit 130 is displayable on a liquid crystal display (LCD) 150.

Image data to which image processing has been applied by the image processing circuit 130 is compressed through an image conversion circuit 160, and written to and recorded on a memory card 170. The image conversion circuit 160 has the function of compressing the image data from the image processing circuit 130 and outputting the compressed image data to the memory card 170 and a function of decompressing image data read from the memory card 170 and outputting the decompressed image data to the image processing circuit 130. Data files of captured still images are thereby recorded on the memory card 170.

In recording a moving image, image signals successively processed by the image processing unit 130 are compressed through the image conversion circuit 160, and the data file of the captured moving image is successively recorded on the memory card 170.

The system control circuit 180 performs through-the-lens (TTL) automatic focus (AF) processing, automatic exposure (AE) processing, and preliminary flash emission (electronic flash [EF]) processing using signals processed by the image processing circuit 130. As for exposure conditions during image capturing, the system control circuit 180 can calculate given conditions from the result of the AE processing and conditions for dynamic range extension, and issue control instructions to the lens control unit 111 and an image sensor driving circuit (not illustrated).

An operation unit 190 is an operation unit for the photographer to input instructions to the imaging apparatus, and includes a release button, a mode switch dial for still and moving images, and a zoom operation member, for example. The operation unit 190 notifies the system control circuit 180 of the inputs made.

Figure 2:
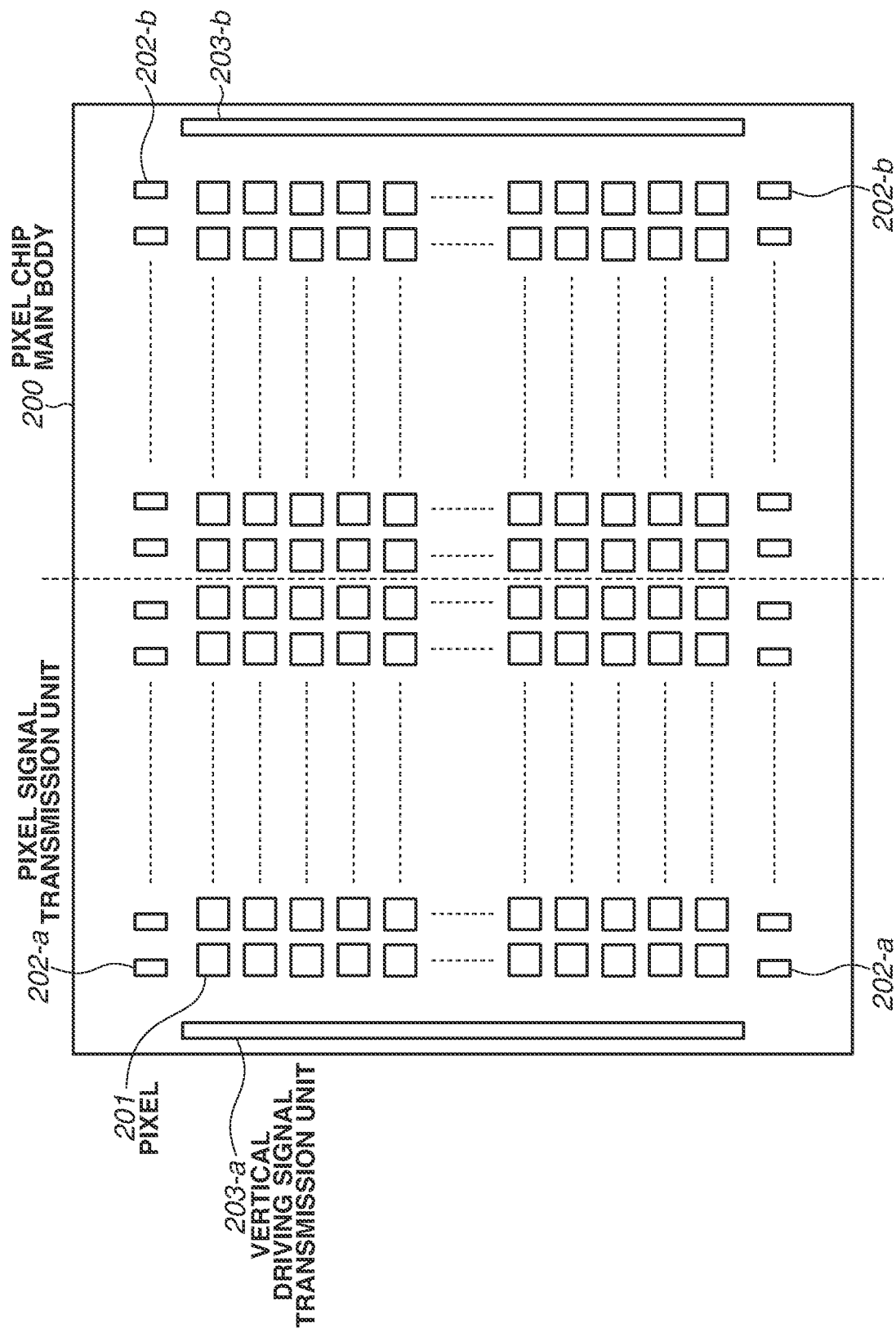
FIG. 2 is a plan view illustrating a pixel chip main body of a layered image sensor.
Figure 3:
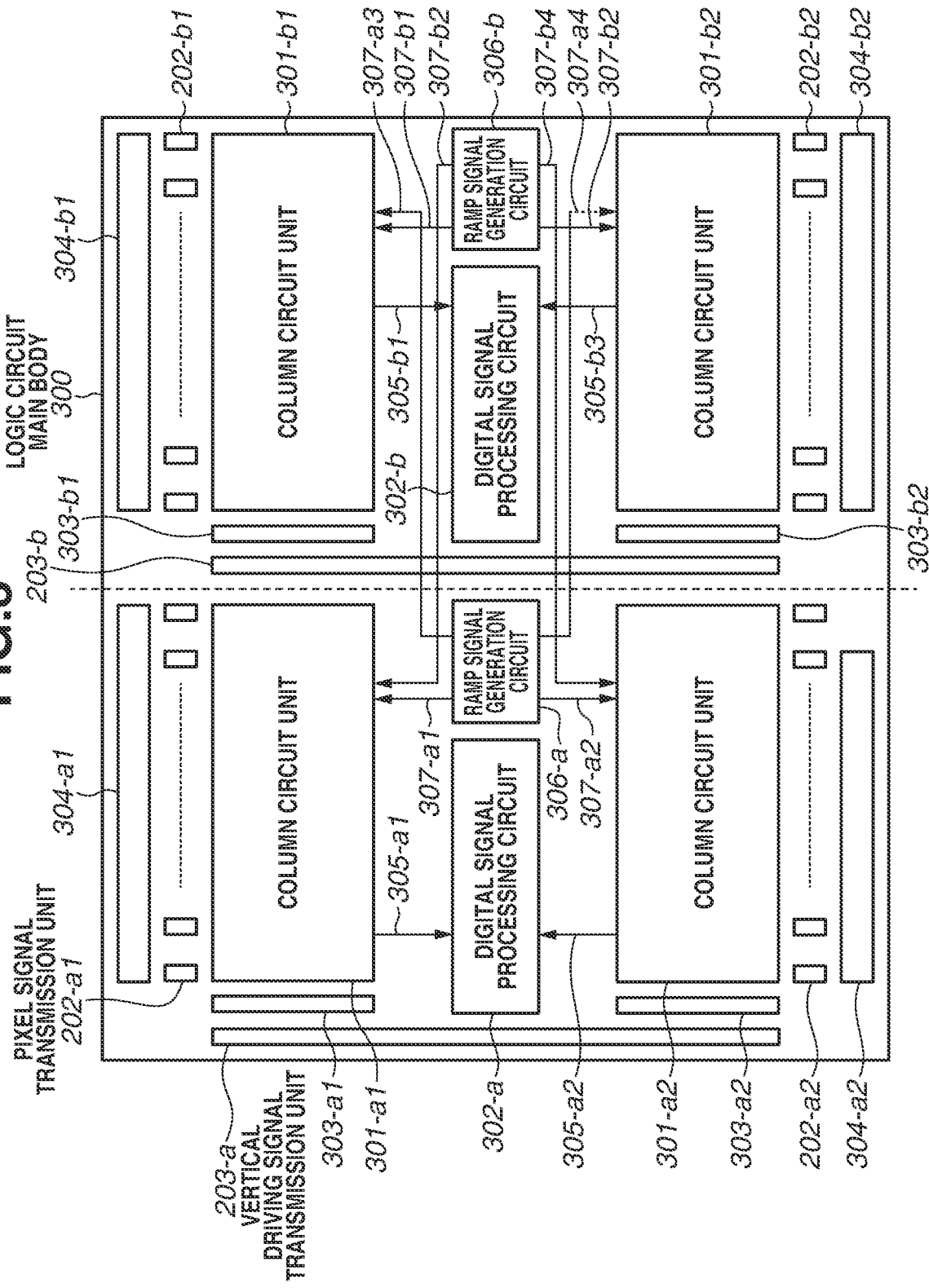
FIG. 3 is a plan view illustrating a logic chip main body of the layered image sensor.

FIG. 2 is a plan view of a substrate including a pixel chip of the layered image sensor 120 according to the present exemplary embodiment. FIG. 3 is a plan view of a substrate including a logic chip of the layered image sensor 120, and mainly illustrates the image of a packaging layout. The layered image sensor 120 includes the pixel chip and the logic chip that are stacked on each other.

In FIG. 2, a pixel chip main body 200 includes unit pixels (hereinafter, referred to simply as pixels) 201 arranged in a matrix, pixel signal transmission units 202 that transmit pixel output signals to the logic chip to be described below, and vertical driving signal transmission units 203 to which vertical driving signals are supplied from the logic chip to be described below. The pixel signal transmission units 202 and the vertical driving signal transmission units 203 are separated into left pixel signal transmission units 202-a and right pixel signal transmission units 202-b and into a left vertical driving signal transmission unit 203-a and a right vertical driving signal transmission unit 203-b, respectively (suffixes, that begin with "-" and are followed by one or more alphanumeric symbols, are used with reference numerals to indicate one or more specific instances of the feature identified by the reference numeral).

In FIG. 3, a logic chip main body 300 includes column circuit units 301, digital signal processing circuits 302, repeater circuits 303, output interface circuits 304, analog-to-digital converter (ADC) output data lines 305, ramp signal generation circuits 306, and ramp signal supply lines 307.

Silicon layers and most of wiring layers of the logic chip main body 300 are manufactured by left- and right-half, two separate shots of split exposure in a semiconductor exposure system. Thus, a left digital signal processing circuit 302-*a* and a right digital signal processing circuit 302-*b* are formed using the same mask pattern, with the broken line at the center illustrated in FIGS. 2 and 3 therebetween. A left ramp signal generation circuit 306-*a* (first ramp signal generation circuit) and a right ramp signal generation circuit 306-*b* (second ramp signal generation circuit) are also formed.

The column circuit units 301 are located above and below the digital signal processing circuits 302. The left pixel signal transmission units 202-*a* and the right pixel signal transmission units 202-*b* are laterally symmetrically located near the upper and lower sides of the pixel chip main body 200 and the logic chip main body 300. The left column circuit units 301-*a*1 and 301-*a*2 are thus located as a group, and so are the right column circuit units 301-*b*1 and 301-*b*2.

The repeater circuits 303 provide a repeater function for logic signal transmission between the digital signal processing circuits 302 and the output interface circuits 304. The repeater circuits 303 are formed as left repeater circuits 303-*a*1 and 303-*a*2 and right repeater circuits 303-*b*1 and 303-*b*2.

The output interface circuits 304 are formed as first and second left output interface circuits 304-*a*1 and 304-*a*2 and first and second right output interface circuits 304-*b*1 and 304-*b*2. Video outputs of the digital signal processing circuits 302 are input to the output interface circuits 304 via the repeater circuits 303. The output interface circuits 304 output the video outputs as respective first to fourth layered sensor raw output signals S100 to S103 (see FIGS. 4A and 4B) that are clock-embedded differential high-speed serial signals, for example. The pixel signal transmission units 202 are disposed at the same planar positions in the stacking direction of the pixel chip main body 200 and the logic chip main body 300, and supply the pixel signals from the pixel chip main body 200 to the column circuit units 301.

The column circuit units 301 AD-convert the pixel signals, supply the resulting signals to the digital signal processing circuits 302, and the signals are subjected to signal processing to be described below. The digital signal processing circuits 302 generate pixel control signals related to vertical driving of the pixel chip main body 200, and supply the pixel control signals to the pixel chip main body 200 from the left and right vertical driving signal transmission units 203-*a* and 203-*b*.

Some of the wiring layers of the logic chip main body 300 are exposed by a single shot of exposure (hereinafter, batch exposure) with reduced exposure resolution in the semiconductor exposure system. The ADC output data lines 305 and the ramp signal supply lines 307 are formed by batch exposure.

When the left and right column circuit units 301-*a* and 301-*b* convert the pixel signals transmitted via the left and right pixel signal transmission units 202-*a* and 202-*b* into digital signals, ramp signals output from both the left and right ramp signal generation circuits 306-*a* and 306-*b* are to be supplied thereto. For that purpose, the ramp signal supply lines 307 are configured so that the left and right ramp signal generation circuits 306-*a* and 306-*b* laterally alternately supply the ramp wave signals to the left and right column circuit units 301-*a* and 301-*b*.

Such a configuration enables the layered image sensor 120 to extend a signal dynamic range to be described below and accelerate AD conversion by using the left and right ramp wave signals separately, thus improving performance.

Figure 4A:
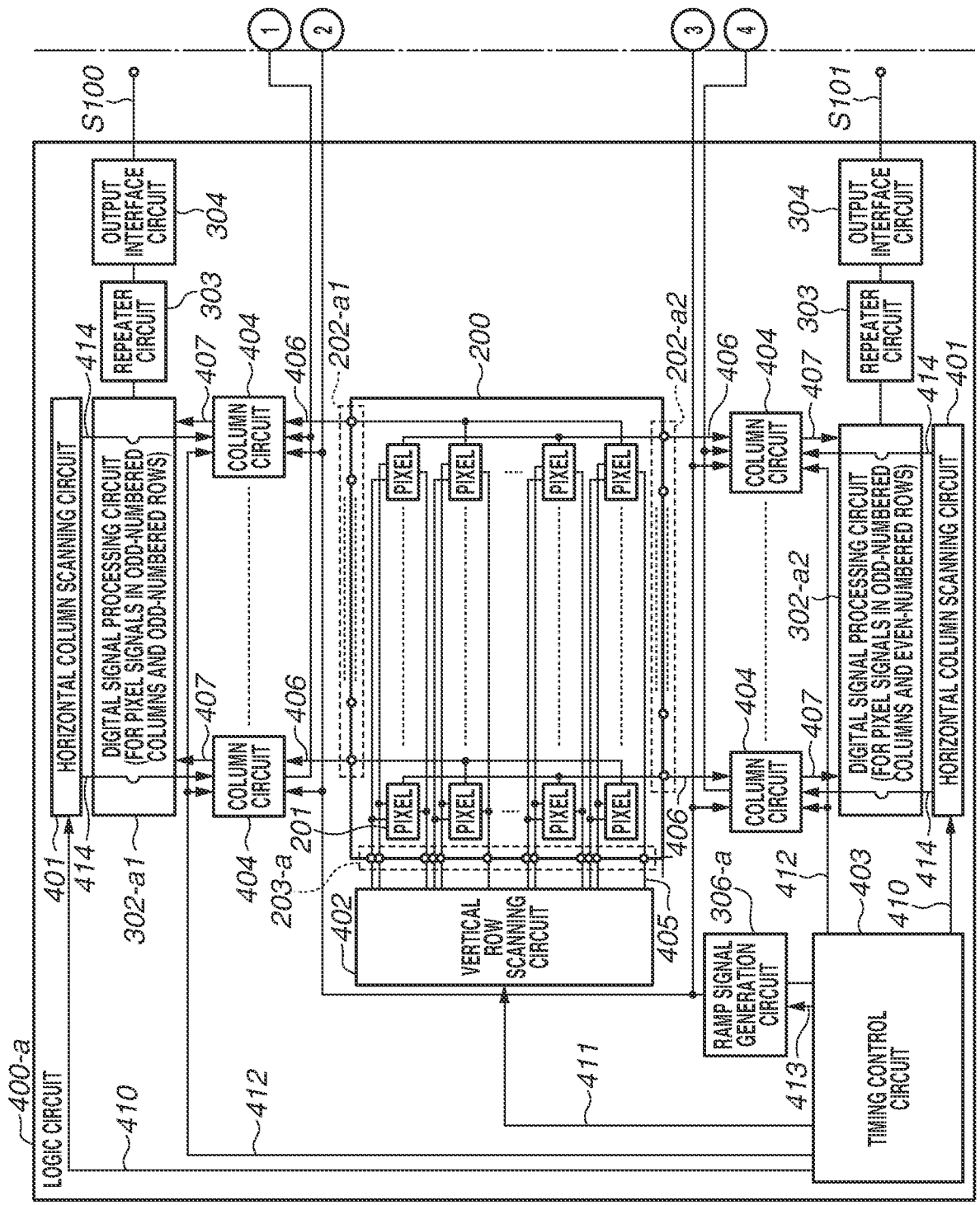
FIGS. 4A and 4B are, in combination, an overall internal block diagram illustrating the layered image sensor.
Figure 4B:
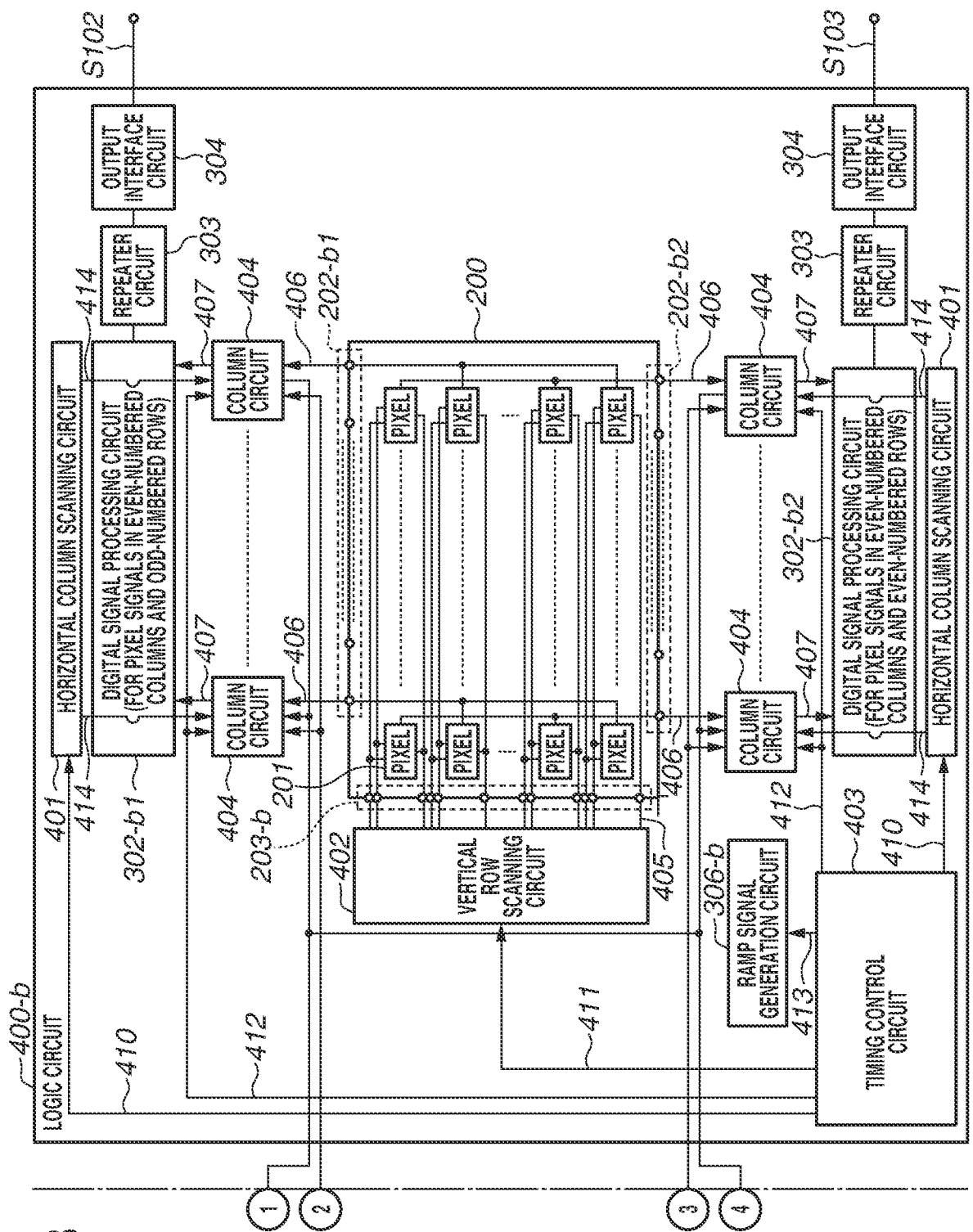

FIGS. 4A and 4B are, collectively, a diagram illustrating a circuit configuration and connection relationship of the entire layered image sensor 120 according to the present exemplary embodiment for more detailed description.

The layered image sensor 120 illustrated in FIGS. 4A and 4B includes the pixel chip main body 200, which includes the pixels 201; horizontal column scanning circuits 401; vertical row scanning circuits 402; timing control circuits 403; and a plurality of column circuits 404 which constitute the column circuit units 301 of FIG. 3. The layered image sensor 120 further includes the logic chip main body 300 including left and right logic circuits 400-*a* and 400-*b* including the ramp signal generation circuits 306 and the repeater circuits 303.

The logic circuit 400-*a* (first signal processing circuit) is a circuit block located in the left area of split exposure illustrated in FIG. 3. The logic circuit 400-*b* (second signal processing circuit) is a circuit block located in the right area of split exposure illustrated in FIG. 3.

The pixels 201 of the pixel chip main body 200 are horizontally and vertically arranged in a matrix. The plurality of pixels 201 is provided with a 2×2-array color filter including repetitions of red (R) and green (G) filters in odd-numbered rows and repetitions of G and blue (B) filters in even-numbered rows.

The vertical row scanning circuits 402 select pixel arrays of the pixel chip main body 200 row by row, and control driving of a reset operation and a read operation on the selected pixel row. The vertical driving signal transmission units 203 are connected to the pixel rows in common, and transmit row-by-row driving control signal groups 405 from the vertical row scanning circuits 402 to be described below. The vertical driving signal transmission units 203 are connected to the pixel columns in common. The pixel signals of the rows selected by vertical driving signal lines are read into the pixel signal transmission units 202 via respective corresponding vertical signal lines 406.

The column circuits 404 are provided for the respective corresponding vertical signal lines 406, and apply signal processing to be described below to respective row-by-row pixel signals transmitted through the vertical signal lines 406. The horizontal column scanning circuits 401 select the column circuits 404 column by column via respective connected column selection lines 414. The digital signal processing circuits 302-*a*1, 302-*a*2, 302-*b*1, and 302-*b*2 then perform predetermined signal processing on image signals 407 digitized by the column circuits 404.

The resulting signals are output as the first to fourth layered sensor raw output signals S100 to S103 via the respective repeater circuits 303 and output interface circuits 304. The layered sensor raw output signals S100 to S103 output from the layered image sensor 120 are output to the image processing circuit 130 of FIG. 1 in the form of digitized row-by-row pixel signals.

The timing control circuits 403 output various clock signals, control signals, and other signals for operating the components of the layered image sensor 120 based on control signals from the system control circuit 180. Here, control lines 410 to 413 transmit the clock signals, the control signals, and other signals from the timing control circuits 403 to the horizontal column scanning circuits 401, the vertical row scanning circuits 402, the column circuits 404, and the ramp signal generation circuits 306, respectively. Control lines 414 transmit control signals for column selection from the horizontal column scanning circuits 401 to the column circuits 404.

Figure 5:
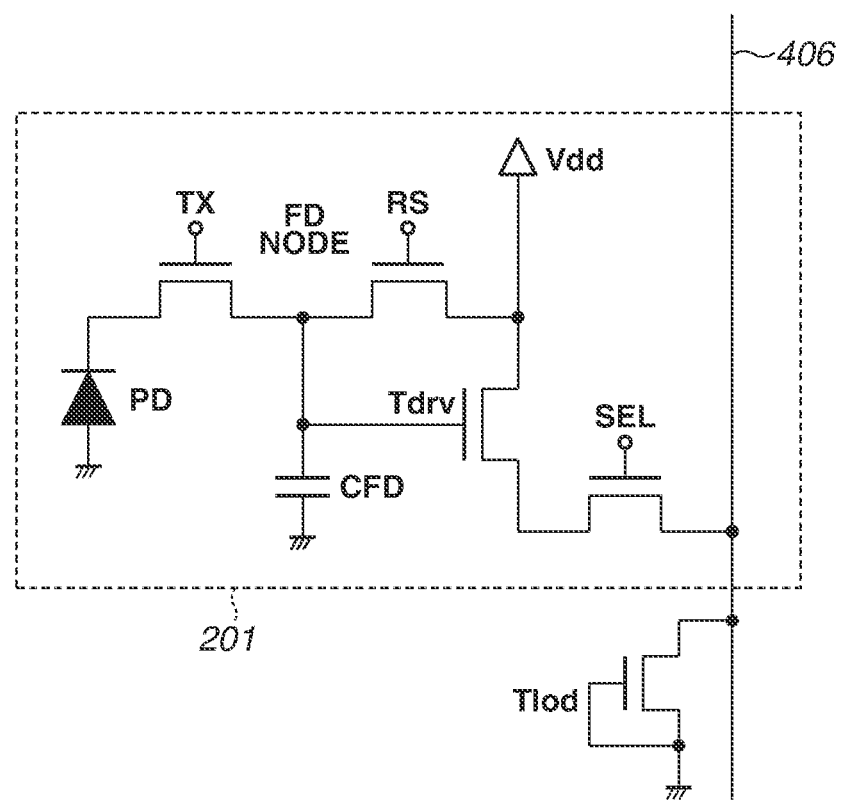
FIG. 5 is a circuit diagram illustrating a unit pixel of the layered image sensor.

FIG. 5 is a diagram illustrating a circuit configuration of a pixel 201 in the pixel chip main body 200. The pixel 201 surrounded by the dotted line representatively illustrates one of the pixels 201 constituting the pixel chip main body 200. The pixel 201 is connected to other circuits by a driving control signal group 405 and a vertical signal line 406.

The vertical signal line 406 is connected to a load circuit and a column circuit 404, and is connected to the pixels 201 in the vertical pixel column in common to output pixel signals.

The driving control signal group 405 is connected to a vertical row scanning circuit 402 via a vertical driving signal transmission unit 203. The driving control signal group 405 is also connected to the pixels 201 in the horizontal row in common, and simultaneously controls the pixels 201 in the horizontal row to enable resetting and signal reading. The driving control signal groups 405 illustrated in FIGS. 4A and 4B each include a transfer control line pTX, a reset control line pRS, and a vertical selection line pSEL to be described below.

A photoelectric conversion element PD is a photodiode that converts light into an electrical charge and accumulates the converted charge. The photoelectric conversion element PD is grounded at the P side of its PN junction, and connected at the N side to the source of a transfer transistor (transfer switch) TX. The gate of the transfer transistor (transfer switch) TX is connected to the transfer control line pTX, and the drain is connected to a floating diffusion (FD) capacitor CFD, so that the transfer of the charge from the photoelectric conversion element PD to the FD capacitor CFD is controlled.

The FD capacitor CFD has a capacitance capable of injecting a specific amount of charge. The FD capacitor CFD is grounded at one side, and accumulates the charge transmitted from the photoelectric conversion element PD in converting the charge into a voltage. The node connecting the drain of the transfer transistor (transfer switch) TX and the other side of the FD capacitor CFD will be referred to as an FD node of an FD portion.

The gate of a reset transistor (reset switch) RS is connected to the reset control line pRS, the drain is connected to a power supply voltage Vdd, and the source is connected to the FD capacitor CFD. The potential of the FD node can be reset to the power supply voltage Vdd by turning on the reset transistor (reset switch) RS. When the reset transistor (reset switch) RS is off, the FD capacitor CFD converts the charge transferred from the photoelectric conversion element PD into a voltage.

A driving transistor (amplification unit) Tdrv constitutes an intra-pixel amplifier. The gate of the driving transistor (amplification unit) Tdrv is connected to the FD capacitor CFD, the drain is connected to the power supply voltage Vdd, and the source is connected to the drain of a selection transistor (selection switch) SEL. The driving transistor Tdrv outputs a voltage corresponding to that of the FD capacitor CFD. The gate of the selection transistor (selection switch) SEL is connected to the vertical selection line pSEL, and the source is connected to the vertical signal line 406. The selection transistor (selection switch) SEL outputs the output of the driving transistor Tdrv to the vertical signal line 406 as the output signal of the pixel 201.

A load transistor Tlod of the load circuit provided for each vertical signal line 406 is grounded at the source and gate, and connected to the vertical signal line 406 at the drain. The load transistor Tlod constitutes source follower circuits serving as intra-pixel amplifiers with the driving transistors Tdrv of the pixels 201 in the column connected by the vertical signal line 406. In outputting the signal of the pixel 201, the load transistor Tlod is typically operated as a grounded-gate constant current source. As employed in the present exemplary embodiment, the transistors other than the driving transistor Tdrv and the load transistor Tlod function as switches. Such transistors conduct (ON) when the control lines connected to their gates are high, and shut off (OFF) when the control lines are low.

Figure 6:
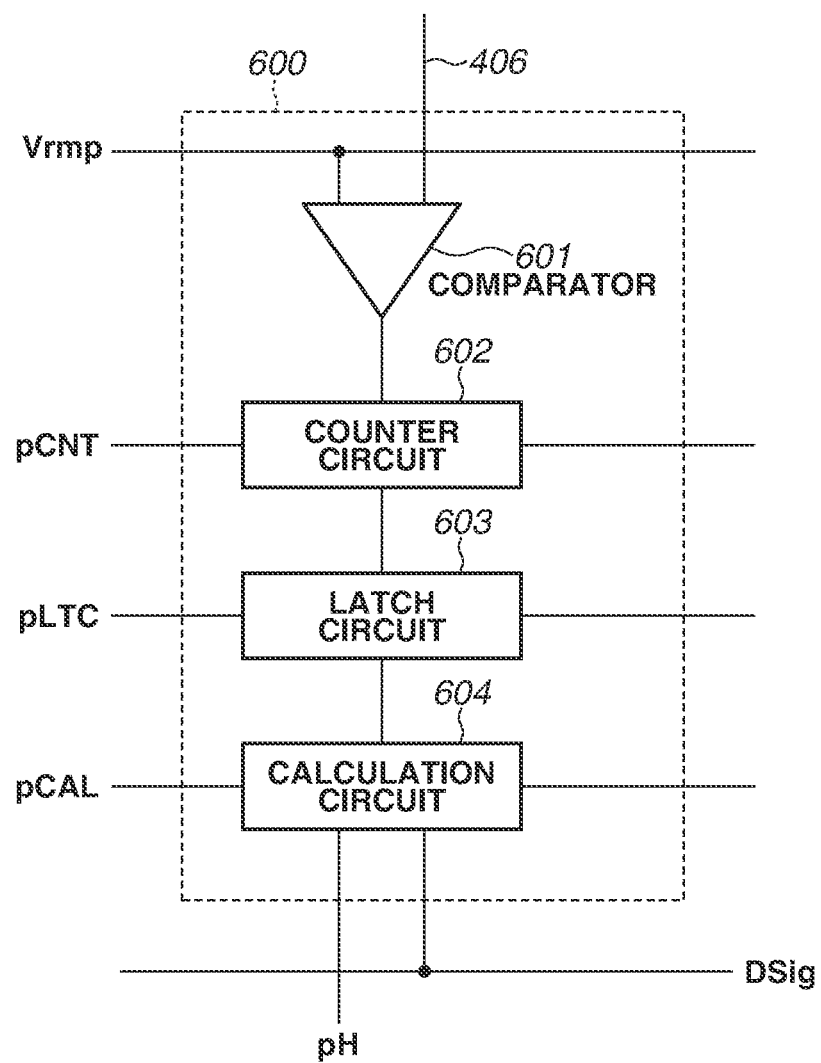
FIG. 6 is a block diagram illustrating a column-by-column analog-to-digital (AD) conversion circuit in a column circuit of the layered image sensor.

FIG. 6 is a diagram illustrating a circuit configuration of an AD conversion circuit 600 in a column circuit 404 of the layered image sensor 120 according to the present exemplary embodiment. The AD conversion circuit 600 illustrated in FIG. 6 includes a comparator 601, a counter circuit 602, a latch circuit 603, and a calculation circuit 604.

The comparator 601 is connected to a ramp wave signal line Vrmp and the pixel signal (Vsig) output from the vertical signal line 406 as two inputs, and outputs a comparison result. For example, the comparator 601 outputs the comparison result by changing its output signal from a high level to a low level when the relationship in magnitude between the two input signals is reversed.

A ramp wave that the timing control circuit 403 outputs to the ramp wave signal line Vrmp is a triangular wave changing gradually from an initial voltage. It is sufficient that the amplitude of the ramp wave has a sufficient margin with respect to the signal amplitude of the pixel signal (Vsig) input to the comparator 601. The comparator 601 outputs the comparison result when the gradually changing ramp wave intersects the pixel signal.

The counter circuit 602 is connected to a counter control line pCNT, and operates its counter based on clocks supplied from the counter control line pCNT. The counter circuit 602 starts a count operation in synchronization with the start of the ramp wave. In response to receiving the signal of the comparison result from the comparator 601, the counter circuit 602 outputs the count value at that time. This count value is the signal obtained by digitizing the pixel signal received via the vertical signal line 406.

The latch circuit 603 is connected to a latch control line pLTC, temporarily stores the count value output from the counter circuit 602, and outputs the stored count value under control via the latch control line pLTC. The calculation circuit 604 is connected to a calculation control line pCAL, and stores the count value output from the latch circuit 603 as a digital pixel signal under control via the calculation control line pCAL.

The calculation circuit 604 further includes a correlated double sampling (CDS) circuit function, and subtracts a reset signal from the latched pixel signal, thus removing reset noise occurring during resetting from the digital pixel signal. The calculation circuit 604 outputs the stored digital pixel signal to a digital output line DSig under control via a corresponding selection line pH.

As described above, the AD conversion circuit 600 illustrated in FIG. 6 constitutes an AD conversion circuit using the comparator 601, the counter circuit 602, the latch circuit 603, and the ramp wave signal line Vrmp.

Here, the column selection line 412 extending from the timing control circuit 403 is represented as the counter control line pCNT, the latch control line pLTC, and the calculation control line pCAL. The output signal from the ramp signal generation circuit 306 is represented by the ramp wave signal line Vrmp. The column selection line 414 extending from the horizontal column scanning circuit 401 is represented by the selection line pH. The output line that is connected to the digital signal processing circuit 302 and outputs the pixel signal 407 is represented by the digital output line DSig. Above is the description of the basic configuration of the imaging apparatus according to the present exemplary embodiment.

Figure 7:
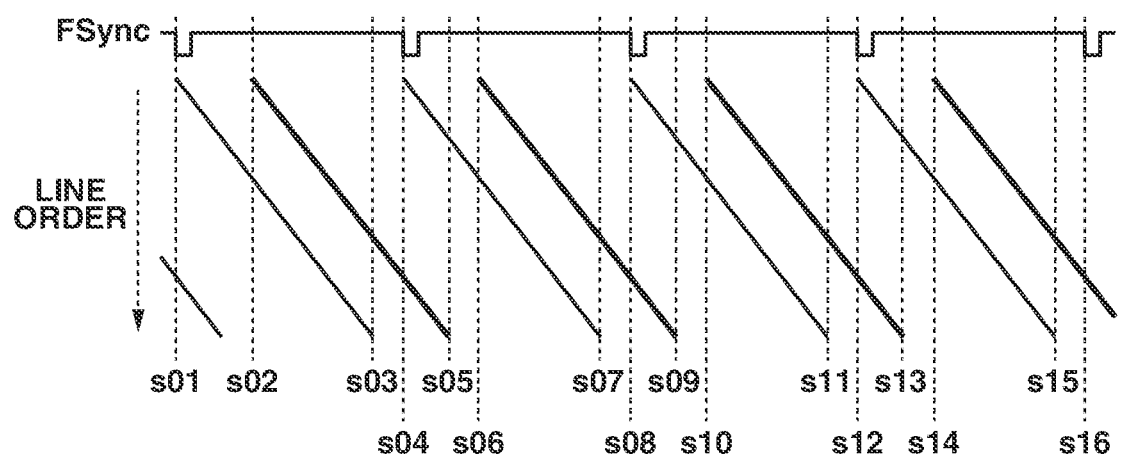
FIG. 7 is a timing chart of imaging by the layered image sensor.

Next, a basic operation of the foregoing imaging apparatus will be outlined. FIG. 7 is a timing chart illustrating an imaging operation of the imaging apparatus.

In FIG. 7, a frame synchronization signal FSync is a synchronization signal for driving the layered image sensor 120. The frame synchronization signal FSync is active at falling edges, and the layered image sensor 120 performs a predetermined operation frame by frame. In the present exemplary embodiment, the signals falling at regular intervals indicated by timing s01, s04, s08, s12, and s16 constitute the frame synchronization signal FSync.

The vertical direction indicates, in a simplified manner, the operation timing from the first row to the last row in controlling the pixel chip main body 200 of the layered image sensor 120 row by row. For example, timing s01 to s03 represents an operation of reading pixel signals row by row.

Timing s02 to s05 represents an operation of resetting the charges of the photoelectric conversion elements PD row by row to start exposure. The thick line indicates the reset timing at the respective rows. Timing s04 to s07 represents an operation of ending the exposure and reading the pixel signals by reading the charges of the photoelectric conversion elements PD row by row. Thus, the signal of the object image is obtained.

Similarly, in the operations starting at timing s06 and s10, the charges of the photoelectric conversion elements PD are reset to start exposure. In the operations starting at corresponding timing s08 and s12, the exposure is ended and the pixel signals are read by reading the charges of the photoelectric conversion elements PD. In such a manner, continuous imaging is performable by controlling exposure and reading the pixel signals frame by frame.

Next, an operation of reading a pixel 201 in the layered image sensor 120 will be described with reference to FIGS. 8A to 8D. FIGS. 8A to 8D are timing charts illustrating a pixel operation of the layered image sensor 120, and illustrate the operation timing of the transfer control line pTX, the reset control line pRS, and the vertical selection line pSEL, which are the driving control signal group 405 for controlling the pixel 201.

In FIGS. 8A to 8D, a line synchronization signal LSync is a synchronization signal for driving the layered image sensor 120. The line synchronization signal LSync is active at falling edges, and the layered image sensor 120 performs a predetermined pixel operation line by line (row by row). In other words, the line synch signal LSync controls the pixel operation timing of the pixels 201 row by row from the first row to the last row within the frame synchronization signal period.

Figure 8A:
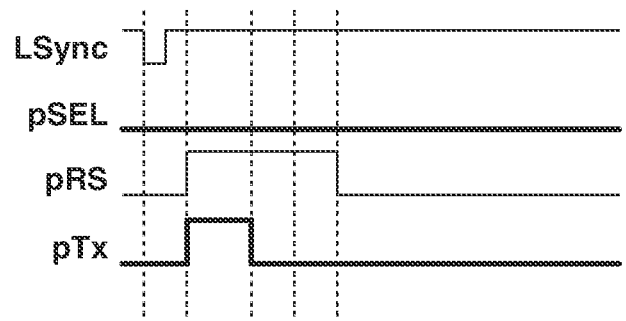
FIGS. 8A to 8D are timing charts of reading of a pixel signal by the layered image sensor.

FIG. 8A representatively illustrates the timing for one line where the charges of the photoelectric conversion elements PD are reset in the row-by-row reset operations starting at the timing s02, s06, and s10 of FIG. 7. After the line synchronization signal LSync, all the signals of the driving control signal group 405 other than that of the vertical selection line pSEL are turned on to reset the photoelectric conversion elements PD and the FD capacitors CFD to the power supply voltage Vdd.

Figure 8B:
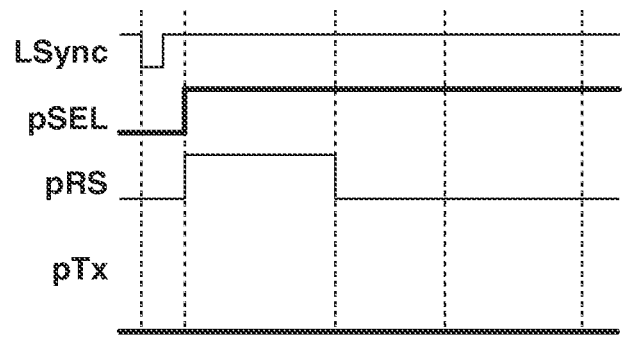
Figure 8C:
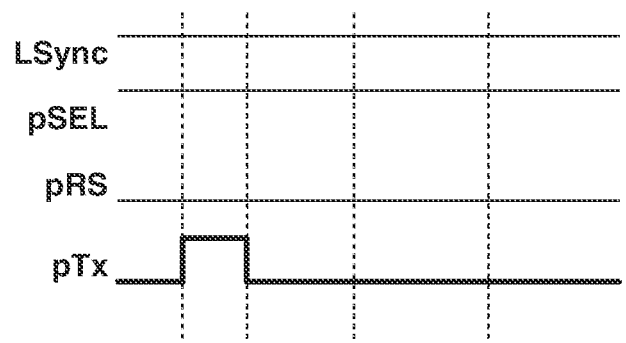
Figure 8D:
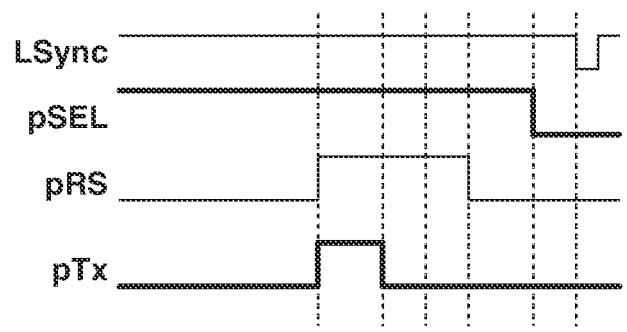

Next, the transfer transistors (transfer switches) TX are turned off to start exposure. The reset transistors RS are then turned off to end resetting the FD capacitors CFD. FIGS. 8B to 8D representatively illustrate the timing of one line where a charge reading operation is performed on the photoelectric conversion elements PD in the row-by-row pixel signal reading operation starting at timing s04, s08, and s12 of FIG. 7.

In FIG. 8B, the reading operation is started. The reset operation of the FD capacitors CFD is initially performed. After the line synchronization signal LSync, the selection transistors SEL are initially turned on with a column gain switch control line pGAIN maintained at a low level, and the pixels 201 are set so that the pixel signals can be output to the vertical signal lines 406. At the same time, the reset transistors RS are turned on to reset the FD capacitors CFD. Here, since the transfer transistors TX are still off, the photoelectric conversion elements PD continue retaining the charges. The reset transistors RS are then turned off to end resetting the FD capacitors CFD.

Next, in FIG. 8C, an operation to transfer the charges of the photoelectric conversion elements PD to the FD portions is performed. More specifically, the transfer transistors TX are turned on to transfer the signal charges from the photoelectric conversion elements PD to FD additional capacitors CFDadd of the FD portions. After the completion of the transfer of the signal charges, the transfer transistors TX are turned off.

Next, in FIG. 8D, the reset operation of the photoelectric conversion elements PD and the FD capacitors CFD is performed. More specifically, the transfer transistors TX and the reset transistors RS are turned on to reset the photoelectric conversion elements PD and the FD capacitors CFD. The transfer transistors TX and the reset transistors RS are then turned off in this order, so that the resetting of the photoelectric conversion elements PD and the FD capacitors CDF is ended. The selection transistors SEL are then turned off to disconnect the pixels 201 that have been readable from the vertical signal lines 406.

Above is the description of the operation of reading one line of pixel signals started with the line synchronization signal LSync in FIG. 8B. The reading of the next row of pixel signals is then started in synchronization with the next line synchronization signal LSync illustrated in FIG. 8D.

Here, in parallel with the operation of reading the next row of pixel signals, the horizontal column scanning circuit 401 selects the column circuits 404 column by column via the respective connected column selection lines 412. The layered image sensor 120 is then controlled so that the pixel signals digitized by the column circuits 404 are output to outside of the layered image sensor 120 via the digital signal processing circuit 302, the repeater circuit 303, and the output interface circuit 304.

The timing operations illustrated in FIGS. 8B to 8D are then successively repeated for a predetermined number of rows, thus performing exposure control and the reading of the image signals for one frame.

Figure 9:
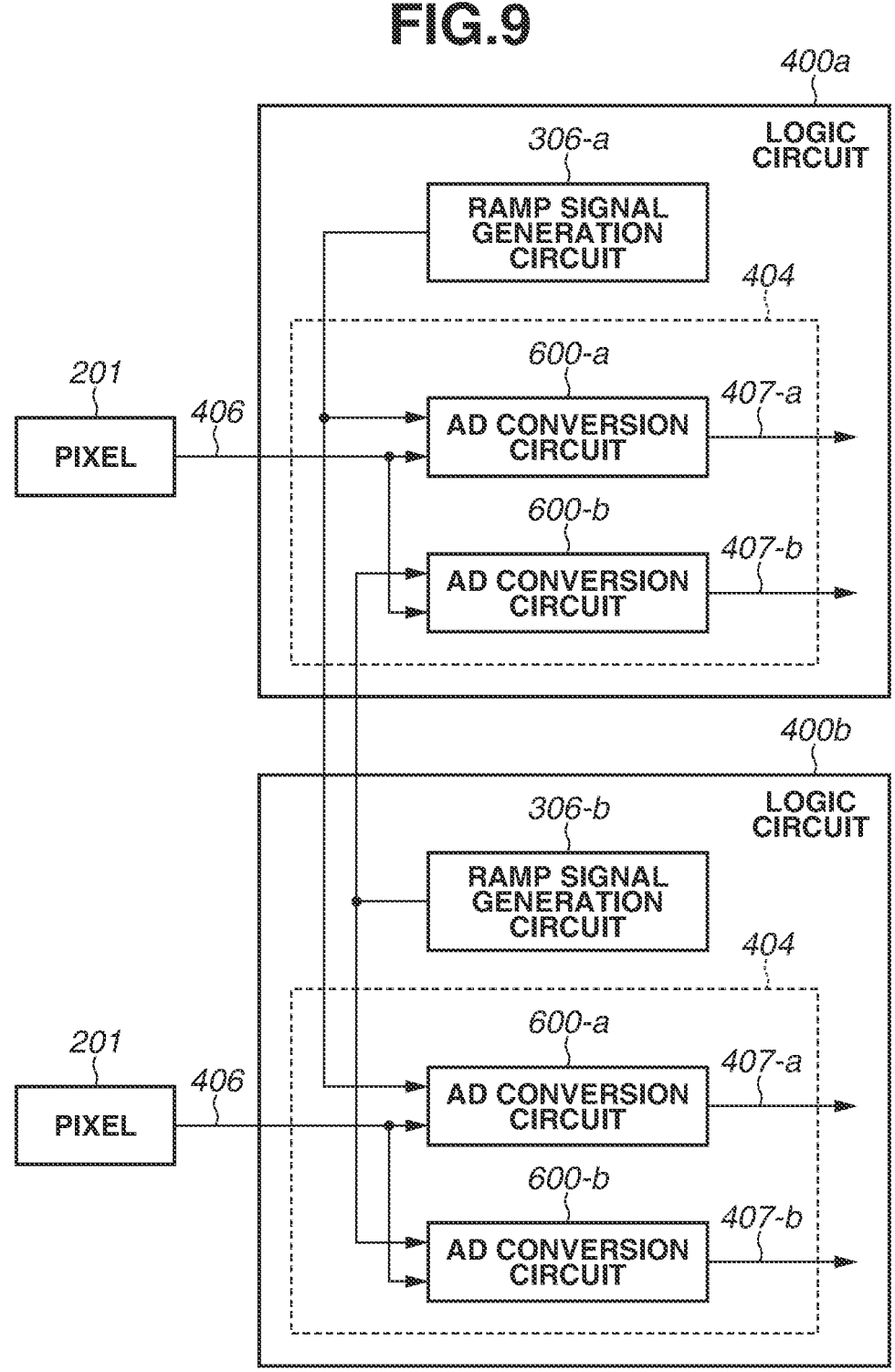
FIG. 9 is a block diagram illustrating column circuits according to a first exemplary embodiment.
Figure 10:
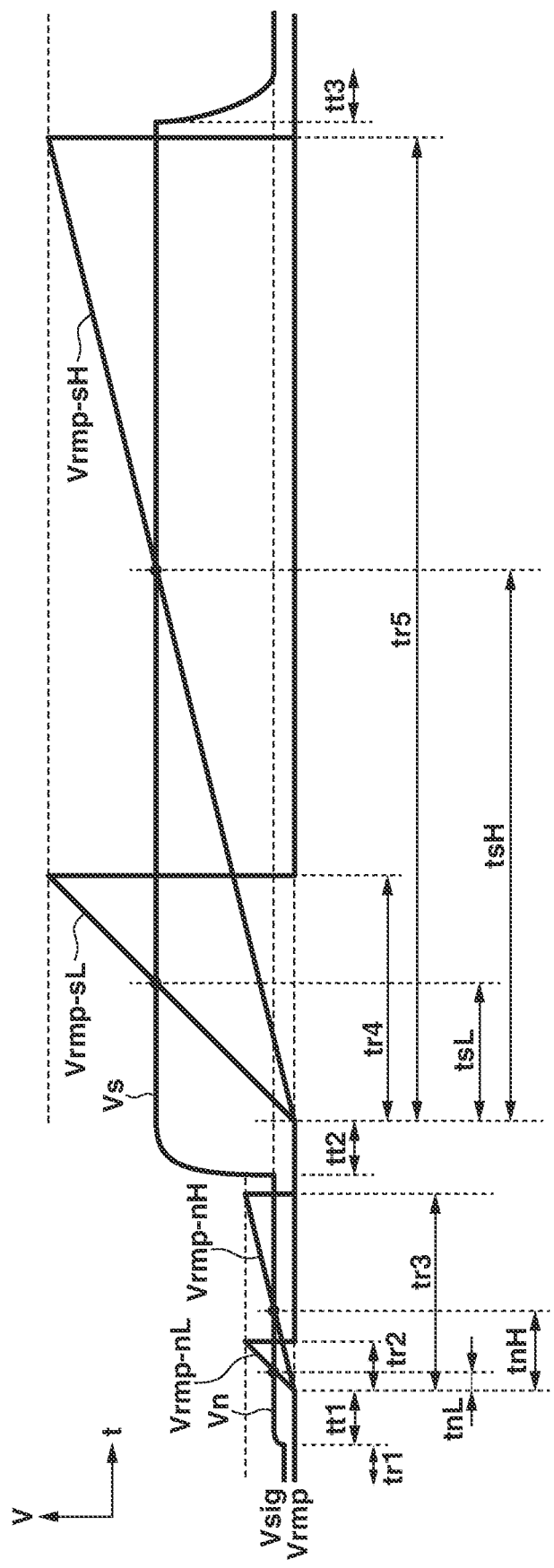
FIG. 10 is a timing chart according to the first exemplary embodiment.

Next, a signal dynamic range extension method and operation according to a first exemplary embodiment will be described with reference to FIGS. 9 and 10. FIG. 9 is a circuit block diagram for illustrating a connection configuration of pixels 201 and column circuits 404.

A pixel signal of an odd-numbered column output from a pixel 201 in the pixel chip main body 200 via a vertical signal line 406 is supplied to the logic circuit 400-*a*. A pixel signal of an even-numbered column is similarly supplied to the logic circuit 400-*b*.

The broken-lined frame in the logic circuit 400-*a* represents the circuit configuration of a column circuit 404 for a single column, which includes two AD conversion circuits 600-*a* and 600-*b*. Each AD conversion circuit has an internal configuration similar to that of the foregoing AD conversion circuit 600 illustrated in FIG. 6. The pixel signal of the odd-numbered column is supplied to the AD conversion circuits 600-*a* and 600-*b* as an analog signal. A ramp wave signal Vrmp-a output from the ramp signal generation circuit 306-*a* is supplied to the AD conversion circuit 600-*a* as a reference signal. Similarly, a ramp wave signal Vrmp-b output from the ramp signal generation circuit 306-*b* is supplied to the AD conversion circuit 600-*b*.

The AD conversion circuits 600-*a* and 600-*b* output the pixel signals AD-converted with reference to the ramp wave signals Vrmp-a and Vrmp-b as digital signals 407-*a* and 407-*b*.

The broken-lined frame in the logic circuit 400-*b* also represents the circuit configuration of a column circuit 404 for a single column, which includes two AD conversion circuits 600-*a* and 600-*b*. The pixel signal of the even-numbered column is supplied to the AD conversion circuits 600-*a* and 600-*b* as an analog signal. The ramp wave signal Vrmp-a output from the ramp signal generation circuit 306-*a* is supplied to the AD conversion circuit 600-*a* as a reference signal. Similarly, the ramp wave signal Vrmp-b output from the ramp signal generation circuit 306-*b* is supplied to the AD conversion circuit 600-*b*.

The AD conversion circuits 600-*a* and 600-*b* output the pixel signals which have been AD-converted with reference to the ramp wave signals Vrmp-a and Vrmp-b, as digital signals 407-*a* and 407-*b*.

A signal dynamic range extension operation will be described based on the foregoing configuration. FIG. 10 is a timing chart illustrating an operation for reading a pixel signal in a column circuit 404 of the layered image sensor 120. A V-direction indicates the potentials of signals, and a t-direction a lapse of time.

In period tr1, an operation for initializing the column circuit 404 is initially performed. The initialization includes, for example, clamping the input signals of the AD conversion circuits 600-*a* and 600-*b*.

Next, in period tt1, the FD capacitor CFD is reset. The pixel operation timing during the resetting is as described in conjunction with FIG. 8B. Period tt1 serves as a reset signal reading period and a signal stabilization period after the FD capacitor CFD is reset and the reset transistor RS is turned off. A reset signal Vn is input to the AD conversion circuits 600-*a* and 600-*b* in the column circuit 404 via the vertical signal line 406.

The reset signal Vn is compared with a ramp wave signal Vrmp-nL generated by the ramp signal generation circuit 306-*a* in period tr2. When the output of the comparator 601 in the AD conversion circuit 600-*a* is then inverted, the latch circuit 603 finalizes the data and stores a count value cnL of period tnL into the calculation circuit 604. This count value cnL serves as a low-gain digital reset signal.

The reset signal Vn is also compared with a ramp wave signal Vrmp-nH generated by the ramp signal generation circuit 306-*b* in period tr3. When the output of the comparator 601 in the AD conversion circuit 600-*b* is inverted, the latch circuit 603 finalizes the data and stores a count value cnH of period tnH into the calculation circuit 604. This count value cnH serves as a high-gain digital reset signal.

Next, the pixel signal reading operation of the layered image sensor 120 transitions to period tt2. In period tt2, the FD capacitor CFD performs charge-to-voltage conversion. The charge of the photoelectric conversion element PD is transferred to the FD capacitor FD of the FD portion. Period tt2 serves as the period of charge transfer from the photoelectric conversion element PD to the FD capacitor CFD of the FD portion and a signal stabilization period.

The pixel signal Vsig input to the AD conversion circuit 600-*a* in the column circuit 404 via the vertical signal line 406 is compared with a ramp wave signal Vrmp-sL generated by the ramp signal generation circuit 306-*a* in period tr4. When the output of the comparator 601 in the AD conversion circuit 600-*a* is inverted, the latch circuit 603 finalizes the data and stores a count value csL of period tsL into the calculation circuit 604. This count value csL serves as a low-gain digital pixel signal.

The pixel signal Vsig input to the AD conversion circuit 600-*b* in the column circuit 404 is compared with a ramp wave signal Vrmp-sH generated by the ramp signal generation circuit 306-*b* in period tr5. When the output of the comparator 601 in the AD conversion circuit 600-*b* is inverted, the latch circuit 603 finalizes the data and stores a count value csH of period tsH into the calculation circuit 604. This count value csH serves as a high-gain digital pixel signal.

The calculation circuit 604 in the AD conversion circuit 600-*b* subtracts the reset signal cnH from the latched pixel signal csH, so that reset noise occurring during the resetting is removed from the pixel signal csH.

The gradients of the ramp wave signals Vrmp-nL and Vrmp-sL generated by the ramp signal generation circuit 306-*a* are set to four times those of the ramp wave signals Vrmp-nH and Vrmp-sH generated by the ramp signal generation circuit 306-*b*. The noise-reduced low-gain pixel signal thus has a gain one-fourth that of the noise-reduced high-gain pixel signal since the inversion period of the comparator 601 is reduced to a quarter.

The calculation circuit 604 in the AD conversion circuit 600-*a* therefore quadruples the noise-reduced low-gain pixel signal by digital calculation. The resulting pixel signal is stored in the calculation circuit 604 as a digital signal value obtained by converting the low-gain pixel signal to be equivalent to a high-gain signal value, in other words, a high gain-equivalent low-gain signal value.

The calculation circuit 604 in the AD conversion circuit 600-*b* subtracts the reset signal cnH from the latched pixel signal csH, so that reset noise occurring during the resetting is removed from the pixel signal csH. The calculation circuit 604 in the AD conversion circuit 600-*b* stores the noise-reduced high-gain pixel signal without change.

By such an operation, the AD conversion of both the low- and high-gain pixel signals is completed.

Next, in period tt3, the photoelectric conversion element PD and the FD capacitor CFD are reset to end the operation of one line where the pixel signals are read. In parallel with the operation of reading the pixel signals in the next row, the horizontal column scanning circuit 401 selects the column circuits 404 column by column via the respective column selection lines 412. The layered image sensor 120 is then controlled so that the stored digital low- and high-gain pixel signals are output to outside of the layered image sensor 120 via the digital signal processing circuit 302, the repeater circuit 303, and the output interface circuit 304.

By the foregoing operation, both the digital signal values of the high-gain pixel signals and those of the high-gain-equivalent low-gain pixel signals are stored into the calculation circuits 604 of the column circuits 404 as pixel-by-pixel signal values. The dynamic range extension circuit 131 in the image processing circuit 130 at the subsequent stage of the layered image sensor 120 then performs the following high dynamic range (HDR) processing.

If a high-gain pixel signal has a digital signal value less than the digital signal value corresponding to the maximum amplitude of the high-gain ramp wave, the digital signal value of the high-gain pixel signal is stored into a calculation circuit (not illustrated) as the signal value of the corresponding pixel.

If the high-gain pixel signal has the digital signal value corresponding to the maximum amplitude of the high-gain ramp wave, the digital signal value of the high-gain-equivalent low-gain pixel signal is stored into the calculation circuit (not illustrated) as the signal value of the corresponding pixel.

Depending on the imaging situation, the pixel values across the entire area can be overexposed. In such a case, the high-gain pixel signals are saturated in level and not needed for image formation. The circuit operations of the AD conversion circuits 600-*b* for outputting the high-gain pixel signals and the ramp signal generation circuits 306-*b* for outputting the high-gain ramp waves may thus be stopped by a not-illustrated power reduction unit.

This can reduce the power consumption of the layered image sensor 120.

As described above, the use of the two ramp signal generation circuits 306-*a* and 306-*b* to output both the AD-converted low- and high-gain pixel signals using two types of ramp waves with different gradients enables extension of the dynamic range of the image signal in the subsequent HDR processing.

Figure 11:
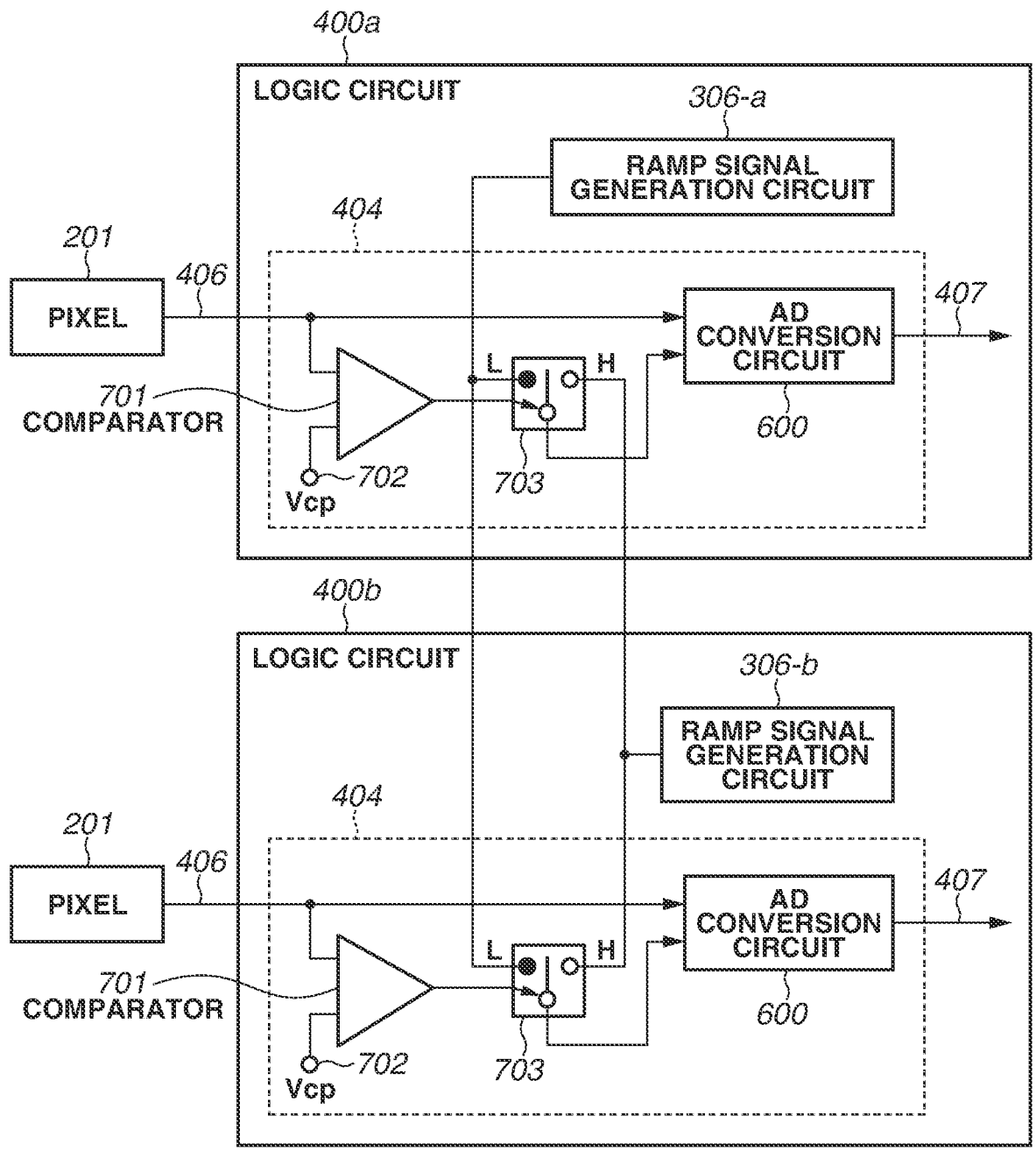
FIG. 11 is a block diagram illustrating column circuits according to a second exemplary embodiment.
Figure 12:
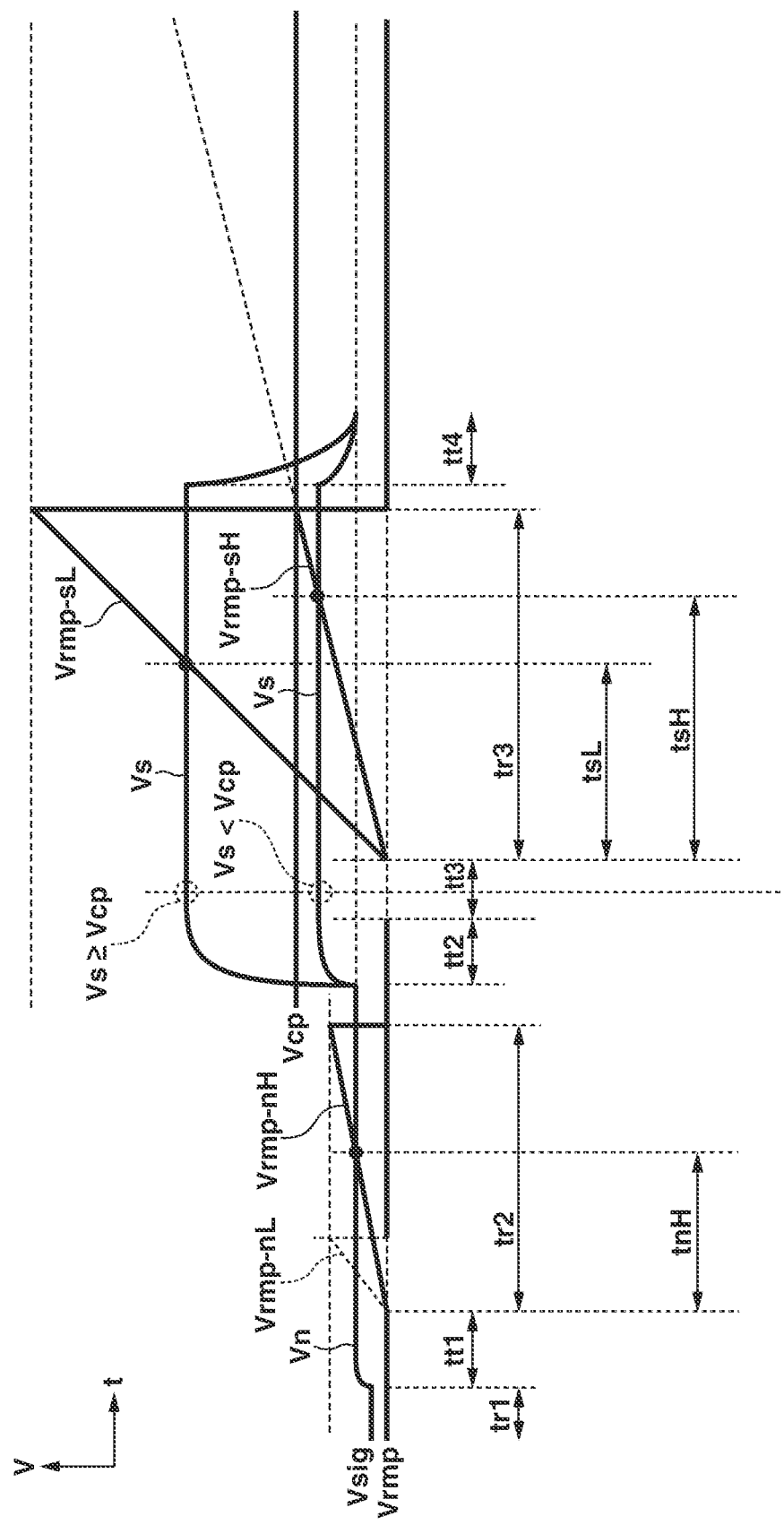
FIG. 12 is a timing chart according to the second exemplary embodiment.

Next, an AD conversion method and conversion operation of pixel signals according to a second exemplary embodiment will be described with reference to FIGS. 11 and 12. FIG. 11 is a circuit block diagram for illustrating a connection configuration of pixels 201 and column circuits 404.

A pixel signal of an odd-numbered column output from a pixel 201 in a pixel chip main body 200 via a vertical signal line 406 is supplied to a logic circuit 400-*a*. Similarly, a pixel signal of an even-numbered column is supplied to a logic circuit 400-*b*.

The broken-lined frame in the logic circuit 400-*a* represents a circuit configuration of a column circuit 404 for a single column, which includes a comparator 701, an analog signal selector 703, and an AD conversion circuit 600. The internal configuration of the AD conversion circuit 600 is similar to that of the foregoing AD conversion circuit 600 illustrated in FIG. 6. The pixel signal of the odd-numbered column is supplied to one input of the AD conversion circuit 600 and one input of the comparator 701 as an analog signal. A comparative voltage Vcp is input to the other input of the comparator 701. The output of the comparator 701 is connected to a switch control terminal of the analog signal selector 703.

A ramp wave signal Vrmp-a output from a ramp signal generation circuit 306-*a* is supplied to one input of the analog signal selector 703. A ramp wave signal Vrmp-b output from a ramp signal generation circuit 306-*b* is supplied to the other input.

The output of the selectively switched analog signal selector 703 is supplied to the AD conversion circuit 600 as a reference signal. A pixel signal AD-converted by comparing the pixel signal of the odd-numbered column input as an analog signal with either one reference signal selected from the ramp wave signals Vrmp-a and Vrmp-b is output from the AD conversion circuit 600 as a digital signal 407.

The broken-lined frame in the logic circuit 400-*b* represents a circuit configuration of a column circuit 404 for a single column, which includes a comparator 701, an analog signal selector 703, and an AD conversion circuit 600. The internal configuration of the AD conversion circuit 600 is similar to that of the foregoing AD conversion circuit 600 illustrated in FIG. 6. The pixel signal of the even-numbered column is supplied to one input of the AD conversion circuit 600 and one input of the comparator 701 as an analog signal. The comparative voltage Vcp is input to the other input of the comparator 701. The output of the comparator 701 is connected to the switch control terminal of the analog signal selector 703.

The ramp wave signal Vrmp-a output from the ramp signal generation circuit 306-*a* is supplied to one input of the analog signal selector 703. The ramp wave signal Vrmp-b output from the ramp signal generation circuit 306-*b* is supplied to the other input.

The output of the selectively switched analog signal selector 703 is supplied to the AD conversion circuit 600 as a reference signal. A pixel signal AD-converted by comparing the pixel signal of the even-numbered column input as an analog signal with either one reference signal selected from the ramp wave signals Vrmp-a and Vrmp-b is output from the AD conversion circuit 600 as a digital signal 407.

The AD conversion operation will be described based on the foregoing configuration. FIG. 12 is a timing chart illustrating an operation for reading a pixel signal in a column circuit 404 of the layered image sensor 120. A V-direction indicates the potentials of signals, and a t-direction a lapse of time.

In period tr1, an operation for initializing the column circuit 404 is initially performed. The initialization includes, for example, clamping the input signals of the AD conversion circuit 600.

Next, in period tt1, the FD capacitor CFD is reset. The pixel operation timing during the resetting is as described in conjunction with FIG. 8B. Here, period tt1 serves as a reset signal reading period and a signal stabilization period after the FD capacitor CFD is reset and the reset transistor RS is turned off. The reset signal Vn is input to the AD conversion circuit 600 in the column circuit 404 via the vertical signal line 406.

In period tr2 where a ramp wave signal Vrmp-nH is generated by the ramp signal generation circuit 306-*b*, the switching control of the analog signal selector 703 is masked by the reset signal Vn. The output of the analog signal selector 703 is thereby fixed to the ramp wave signal Vrmp-nH generated by the ramp signal generation circuit 306-*b*.

The reset signal Vn is compared with the ramp wave signal Vrmp-nH generated by the ramp signal generation circuit 306-*b* in period tr2. When the output of the comparator 601 in the AD conversion circuit 600 is inverted, the latch circuit 603 finalizes the data and stores a count value cnH of period tnH into the calculation circuit 604. This count value cnH serves as a high-gain digital reset signal. At the same time, a value cnL corresponding to the count value of a low-gain digital reset signal is determined by reducing the count value cnH of the digital reset signal into a quarter by digital calculation and stored in the calculation circuit 604.

Next, the pixel signal reading operation by the layered image sensor 120 transitions to period tt2. In period tt2, the FD capacitor CFD performs charge-to-voltage conversion. The charge of the photoelectric conversion element PD is transferred to the FD capacitor CFD of the FD portion. Here, period tt2 serves as the period for transferring the charge from the photoelectric conversion element PD to the FD capacitor CFD of the FD portion and a signal stabilization period.

In period tt3, a pixel signal Vs input to the comparator 701 in the column circuit 404 via the vertical signal line 406 is compared with the comparative voltage Vcp. If the comparison result indicates the that the pixel signal Vs has high brightness, or equivalently, Vs≥Vcp, the analog signal selector 703 selects a ramp wave signal Vrmp-sL generated by the ramp signal generation circuit 306-*a*.

In such a case, the pixel signal Vs also input to the AD conversion circuit 600 in the column circuit 404 is compared with the ramp wave signal Vrmp-sL generated by the ramp signal generation circuit 306-*a*. When the output of the comparator 601 in the AD conversion circuit 600 is inverted, the latch circuit 603 finalizes the data and stores a count value csL of period tsL into the calculation circuit 604. This count value csL serves as a low-gain digital pixel signal.

The calculation circuit 604 in the AD conversion circuit 600 then subtracts the reset signal cnL from the latched pixel signal csL, so that reset noise occurring during the resetting is removed from the pixel signal csL.

On the other hand, if the comparison result indicates that the pixel signal Vs has low brightness, or equivalently, Vs<Vcp, the analog signal selector 703 selects a ramp wave signal Vrmp-sH generated by the ramp signal generation circuit 306-*b*.

In such a case, the pixel signal Vs also input to the AD conversion circuit 600 in the column circuit 404 is compared with the ramp wave signal Vrmp-sH generated by the ramp signal generation circuit 306-*b*. When the output of the comparator 601 in the AD conversion circuit 600 is inverted, the latch circuit 603 finalizes the data and stores a count value csH of period tsH into the calculation circuit 604. This count value csH serves as a high-gain digital pixel signal.

The calculation circuit 604 in the AD conversion circuit 600 then subtracts the reset signal cnH from the latched pixel signal csH, so that reset noise occurring during the resetting is removed from the pixel signal csH.

The gradients of the ramp wave signals Vrmp-nL and Vrmp-sL generated by the ramp signal generation circuit 306-*a* are set to four times those of the ramp wave signals Vrmp-nH and Vrmp-sH generated by the ramp signal generation circuit 306-*b*. The comparative voltage Vcp here is typically set to the full-range voltage of the ramp wave signal Vrmp-sL. The noise-reduced low-gain pixel signal thus has a gain one-fourth that of the noise-reduced high-gain pixel signal since the inversion period of the comparator 601 is reduced to a quarter.

The calculation circuit 604 in the AD conversion circuit 600 therefore quadruples the noise-reduced low-gain pixel signal by digital calculation. The resulting pixel signal is stored in the calculation circuit 604 as a digital signal value obtained by converting the low-gain pixel signal to be equivalent to a high-gain pixel signal, in other words, a high-gain-equivalent low-gain signal value.

Moreover, the calculation circuit 604 in the AD conversion circuit 600 subtracts the reset signal cnH from the latched pixel signal csH, so that reset noise occurring during the resetting is removed from the pixel signal csH. The calculation circuit 604 in the AD conversion circuit 600 stores the noise-reduced high-gain pixel signal without change.

By such an operation, AD conversion using either one of the low- and high-gain pixel signals is completed.

Next, in period tt4, the photoelectric conversion element PD and the FD capacitor CFD are reset to end the operation of one line where the pixel signals are read. In parallel with the pixel signal reading operation of the next row, the horizontal column scanning circuit 401 selects the column circuits 404 via the respective column selection lines 412 column by column. The layered image sensor 120 is controlled so that the digitized low- and high-gain pixel signals stored are output to outside of the layered image sensor 120 via the digital signal processing circuit 302, the repeater circuit 303, and the output interface 304.

By the foregoing operation, either the digital signal value of the high-gain pixel signal or the digital signal value of the high-gain-equivalent low-gain pixel signal is stored into the calculation circuit 604 of the column circuit 404 as the signal value of each pixel.

As described above, the two ramp signal generation circuits 306-*a* and 306-*b* are used to prepare two types of ramp waves with different gradients during the AD conversion of a pixel signal Vs. If the pixel signal Vs has high brightness, the period for the AD conversion can be reduced to a quarter by switching to the ramp wave signal Vrmp-sH with a high gradient, as compared to the ramp wave signal Vrmp-sL with a low gradient.

Figure 13:
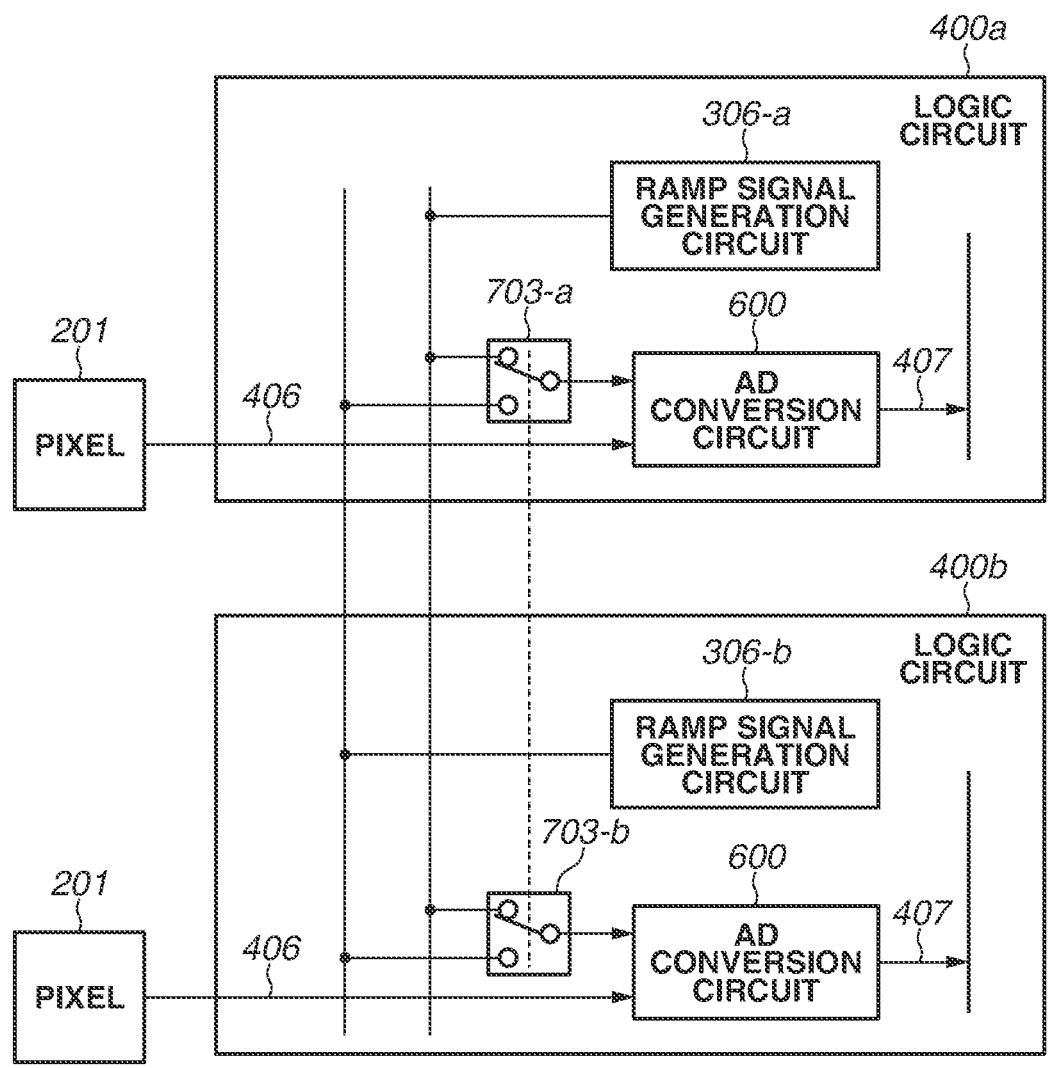
FIG. 13 is a block diagram illustrating column circuits according to a third exemplary embodiment.
Figure 14:
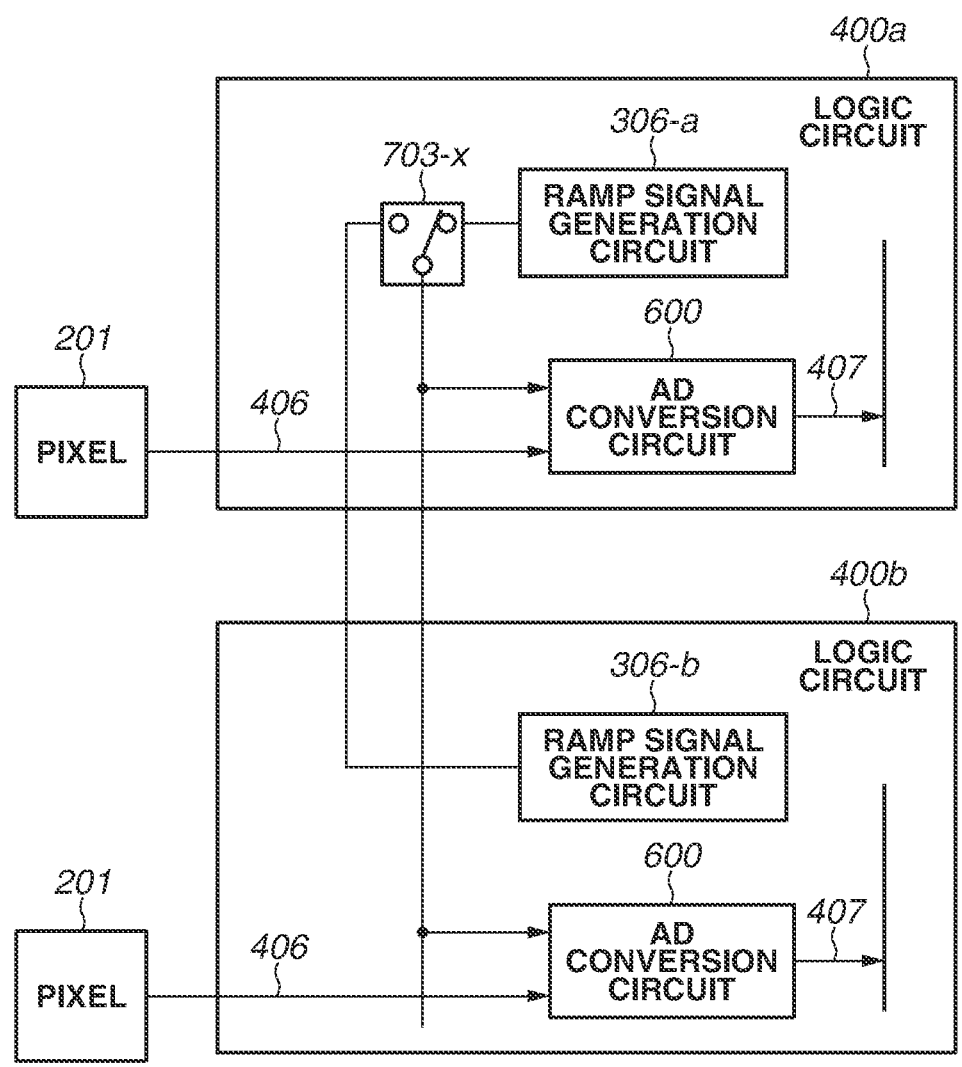
FIG. 14 is a block diagram illustrating column circuits according to the third exemplary embodiment.

Next, an AD conversion method and conversion operation of pixel signals according to a third exemplary embodiment will be described with reference to FIGS. 13 to 17. FIGS. 13 and 14 are circuit block diagrams for illustrating a connection configuration of pixels 201 and logic circuits 400.

In FIG. 13, either one of ramp wave signals Vrmp-a and Vrmp-b is selected using an analog signal selector 703-*a* and an analog signal selector 703-*b*. In FIG. 14, either one of the ramp wave signal lines Vrmp-a and Vrmp-b is selected using an analog signal selector 703-*x*.

The ramp wave signal Vrmp-a from a ramp signal generation circuit 306-*a* is thus usable by both logic circuits 400-*a* and 400-*b*. The ramp wave signal Vrmp-b from a ramp signal generation circuit 306-*b* is also usable by both the logic circuits 400-*a* and 400-*b*.

The ramp wave signals Vrmp-a and Vrmp-b change similarly in voltage (have similar voltage gradients) over time. The ramp signal generation circuit 306-*a* or 306-*b* that is not selected is controlled to stop being powered or enter a power saving mode.

In FIG. 13, the ramp wave signal Vrmp-a is supplied to both the logic circuits 400-*a* and 400-*b*. AD conversion circuits 600 to which pixel signals are input are supplied with the ramp wave signal Vrmp-a via the analog signal selectors 703-*a* and 703-*b* provided for the respective AD conversion circuits 600.

Similarly, the ramp wave signal Vrmp-b is also supplied to both the logic circuits 400-*a* and 400-*b*. The AD conversion circuits 600 to which the pixel signals are input are supplied with the ramp wave signal Vrmp-b via the analog signal selectors 703-*a* and 703-*b* provided for the respective AD conversion circuits 600.

The analog signal selectors 703-*a* and 703-*b* provided for the respective AD conversion circuit 600 can supply the ramp wave signals Vrmp-a and Vrmp-b in a mutually exclusive manner as described above. In FIG. 13, the analog signal selectors 703-*a* and 703-*b* are ganged as illustrated by the broken line, and configured to simultaneously select the same one of the ramp wave signals Vrmp-a and Vrmp-b.

In FIG. 14, the lines of all the AD conversion circuits 600 in both the logic circuits 400-*a* and 400-*b* for the respective ramp wave signals Vrmp-a and Vrmp-b to be input to are all connected in common. The lines are further connected to the analog signal selector 703-*x*.

In FIG. 14, the analog signal selector 703-*x* can supply the ramp wave signals Vrmp-a and Vrmp-b in a mutually exclusive manner. Either one of the ramp wave signals Vrmp-a and Vrmp-b is selected by the analog signal selector 703-*x*.

Figure 15:
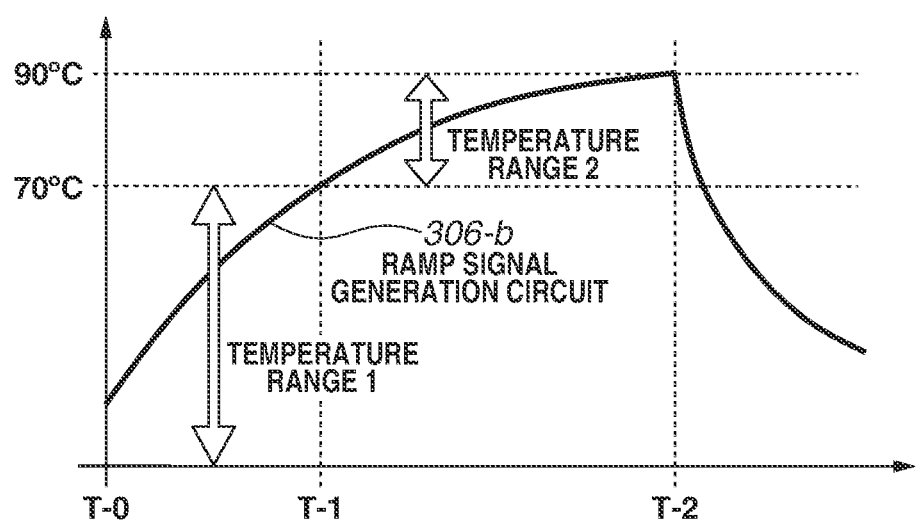
FIG. 15 is a chart illustrating temperature changes in a case where only one ramp signal generation circuit is used according to the third exemplary embodiment.

Next, temperature changes in driving the ramp signal generation circuit 306-*b* will be described. FIG. 15 is a chart illustrating how the temperature of the ramp signal generation circuit 306-b changes over time in capturing a moving image by continuously using only the ramp signal generation circuit 306-b. Specific temperature values in the following description are just an example.

In FIG. 15, the ramp signal generation circuit 306-b is at an ordinary temperature (e.g., 25° C.) at start time T-0, and the temperature rises as the imaging proceeds. The temperature reaches approximately 70° C. at time T-1, and approximately 90° C. at time T-2. At time T-2, the power supply to the ramp signal generation circuit 306-b is stopped. The temperature drops sharply after time T-2.

In a temperature range 1 of up to 70° C., the captured image is not affected by the temperature rise. In a temperature range 2 of beyond 70° C., the captured image is affected by the temperature rise. More specifically, there occurs a phenomenon in which an image corresponding to the portion where the ramp signal generation circuit 306-b is located becomes whitish due to the local heat generation by the ramp signal generation circuit 306-b.

At and above 90° C., the layered image sensor 120 itself can exceed its operating temperature range. The power supply to the ramp signal generation circuit 306-b is thus stopped when the temperature reaches 90° C. At time T-2, the imaging operation is thus suspended. To prevent the effect of the temperature rise on the image, the ramp signal generation circuit 306-b is to be driven within the temperature range 1 of 70° C. or less.

Next, a temperature distribution within the plane of the logic chip main body 300 will be described. Temperature measurement units, not illustrated, are located immediately near the respective ramp signal generation circuits 306-a and 306-b.

Figure 16:
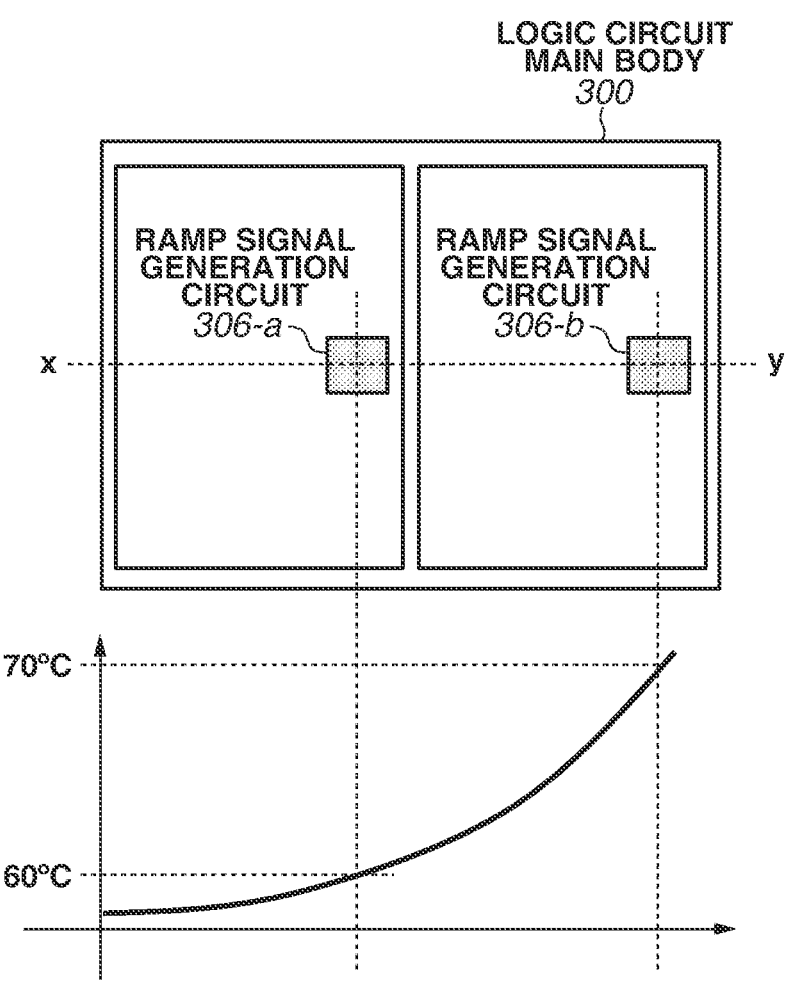
FIG. 16 is a diagram illustrating a temperature distribution within a plane of a logic chip main body in the case where only one ramp signal generation circuit is used according to the third exemplary embodiment.

FIG. 16 illustrates how temperatures are distributed within the plane of the logic chip main body 300 at time T-1 in capturing a moving image by continuously using only the ramp signal generation circuit 306-b. FIG. 16 illustrates the temperature distribution within the plane of the logic chip main body 300, or more specifically, along an x-y section of the logic chip main body 300 at time T-1 of FIG. 15. Specific temperature values in the following description are just an example.

In FIG. 15, the ramp signal generation circuit 306-b reaches approximately 70° C. at time T-1. The temperature is thus approximately 70° C. at the position of the ramp signal generation circuit 306-b on the x-y section of the logic chip main body 300. As the heat is conducted through the plane, the logic chip main body 300 dissipates heat. The temperature falls with increasing distance from the position of the ramp signal generation circuit 306.

This produces a temperature gradient along the x-y section of the logic chip main body 300 as illustrated in FIG. 16. The temperature is approximately 60° C. at the position of the ramp signal generation circuit 306-a. If the ramp signal generation circuit 306-b is used alone, the temperature at the position of the ramp signal generation circuit 306-a is approximately 60° C. when the ramp signal generation circuit 306-b reaches approximately 70° C.

The logic chip main body 300 and the pixel chip main body 200 are laminated with each other and have substantially the same temperature distributions within the plane. A local temperature rise in the plane of the logic chip main body 300 thus leads directly to a local temperature rise in the plane of the pixel chip main body 200, and the effect of the temperature rise appears on the image.

Figure 17:
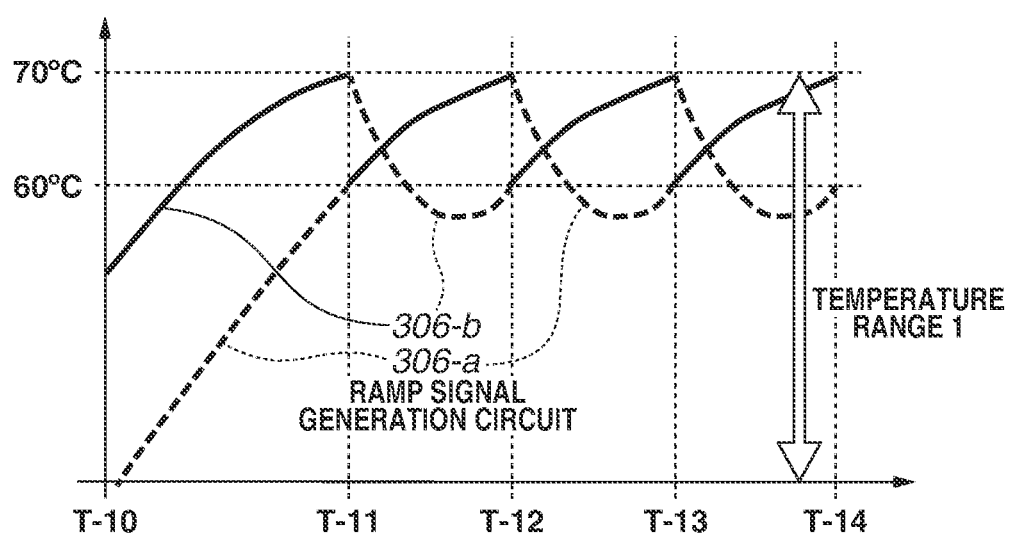
FIG. 17 is a chart illustrating temperature changes of two ramp signal generation circuits in a case where the two ramp signal generation circuits are used in a switching manner according to the third exemplary embodiment.

Next, the temperature changes of the ramp signal generation circuits 306-a and 306-b in a case where the ramp signal generation circuits 306-a and 306-b are used in a switching manner will be described. FIG. 17 illustrates how the temperatures of the ramp signal generation circuits 306-a and 306-b change in a case where the ramp signal generation circuits 306-a and 306-b are used in a switching manner.

Specific temperature values in the following description are just an example. While not illustrated in the drawings, the ramp signal generation circuits 306-a and 306-b have their respective temperature measurement units immediately nearby. FIG. 17 illustrates a case where the ramp signal generation circuits 306-a and 306-b are switched in use when either reaches approximately 70° C. in temperature.

FIG. 17 illustrates the temperature changes of the respective ramp signal generation circuits 306-a and 306-b. The solid lines represent a state where the ramp signal generation circuit is powered. The broken lines represent a state where the ramp signal generation circuit is not powered (or in the power saving mode).

From time T10 to T11, the ramp signal generation circuit 306-b is powered and the ramp signal generation circuit 306-a is not. At time T-11, the ramp signal generation circuit 306-b reaches approximately 70° C., and the ramp signal generation circuit 306-a reaches approximately 60° C. due to heat conduction from the ramp signal generation circuit 306-b (as illustrated in FIG. 16).

At time T-11, the power supply is switched between the ramp signal generation circuits 306-a and 306-b. Specifically, from time T-11 to T-12, the ramp signal generation circuit 306-b is not powered and the ramp signal generation circuit 306-a is powered.

From time T-11 to T-12, the temperature of the ramp signal generation circuit 306-b thus drops sharply from 70° C. and then reaches 60° C. due to heat conduction from the ramp signal generation circuit 306-a. The temperature of the ramp signal generation circuit 306-a rises from 60° C. to 70° C. due to its own heat generation.

At time T-12, the power supply is switched between the ramp signal generation circuits 306-a and 306-b. The actual switching operation of the ramp signal generation circuits 306-a and 306-b is performed in a period other than during an AD conversion operation to prevent the AD conversion from being affected.

In such a manner, the foregoing switching operation is repeated when either of the ramp signal generation circuits 306-a and 306-b reaches 70° C., so that both the ramp signal generation circuits 306-a and 306-b are prevented from exceeding the temperature range 1 of 70° C. Imaging can thus be continued with the image not being affected by a temperature rise.

Figure 18:
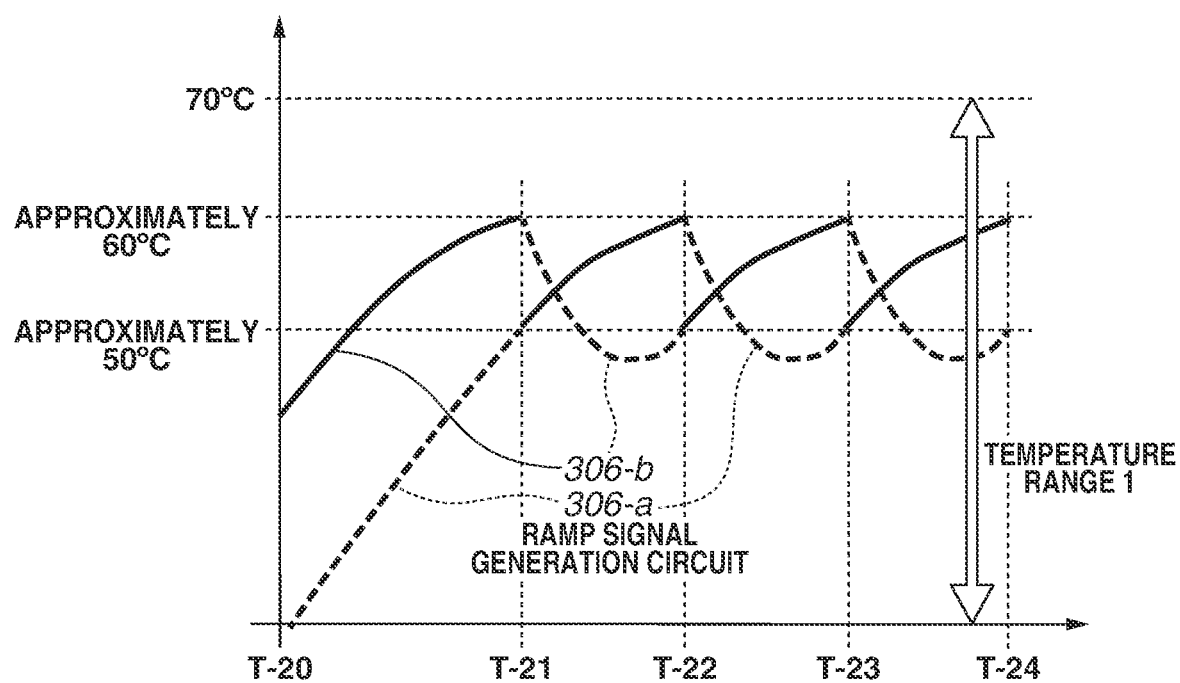
FIG. 18 is a chart illustrating temperature changes of the two ramp signal generation circuits in a case where the two ramp signal generation circuits are used in a switching manner according to the third exemplary embodiment.

FIG. 18 illustrates how the temperatures of the ramp signal generation circuits 306-a and 306-b change when the ramp signal generation circuits 306-a and 306-b are used in a switching manner.

In the example of FIG. 17, the ramp signal generation circuits 306-a and 306-b are switched when either reaches 70° C. in temperature. In FIG. 18, the ramp signal generation circuits 306-a and 306-b are switched simply based on a lapse of a specific time. The specific time is determined by calculating a time interval at which the temperature does not reach 70° C. in advance. The ramp signal generation circuits 306-a and 306-b are switched at a point in time where the temperature is predicted to be sufficiently lower than 70° C.

The repetition of the foregoing switching operation prevents both the ramp signal generation circuits 306-a and 306-b from exceeding the temperature range 1 of 70° C. as illustrated in FIG. 18. The imaging operation can thus be continued without the captured image being affected by a temperature rise.

Alternatively, the ramp signal generation circuits 306-*a* and 306-*b* may be simply switched in units of imaging frames (each frame at minimum). The number of unit frames is determined in advance so that the temperature does not exceed 70° C. The ramp signal generation circuits 306-*a* and 306-*b* are switched at a point in time where the temperature is predicted to be sufficiently lower than 70° C.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-102633, which was filed on Jun. 27, 2022 and which is hereby incorporated by reference herein in its entirety.

What is claimed is:

1. An image sensor, comprising:
a pixel chip including a plurality of unit pixels arranged in a matrix;
a logic chip including a first signal processing circuit and a second signal processing circuit formed by split exposure, the pixel chip and the logic chip being stacked on each other, the first signal processing circuit including a first ramp signal generation circuit and a first analog-to-digital (AD) conversion circuit, and the second signal processing circuit including a second ramp signal generation circuit and a second AD conversion circuit;
wiring connected so that a first ramp signal output from the first ramp signal generation circuit is supplied to the first and second AD conversion circuits, and a second ramp signal output from the second ramp signal generation circuit is supplied to the first and second AD conversion circuits; and
a switch configured to selectively switch between the first ramp signal and the second ramp signal, and supply the selectively switched ramp signal to the first and second AD conversion circuits,
wherein the switch is configured to, in a case where a temperature of the first ramp signal generation circuit or the second ramp signal generation circuit rises to a predetermined temperature, switch between the first and second ramp signals.

2. The image sensor according to claim 1, wherein the first ramp signal has a gradient different from that of the second ramp signal.

3. The image sensor according to claim 1, wherein power to be supplied to the first ramp signal generation circuit or the second ramp signal generation circuit is reduced according to imaging situation.

4. An imaging apparatus comprising:
an image sensor; and
a controller configured to control the image sensor,
wherein the image sensor comprises:
a pixel chip including a plurality of unit pixels arranged in a matrix;
a logic chip including a first signal processing circuit and a second signal processing circuit formed by split exposure, the pixel chip and the logic chip being stacked on each other, the first signal processing circuit including a first ramp signal generation circuit and a first analog-to-digital (AD) conversion circuit, and the second signal processing circuit including a second ramp signal generation circuit and a second AD conversion circuit;
wiring connected so that a first ramp signal output from the first ramp signal generation circuit is supplied to the first and second AD conversion circuits, and a second ramp signal output from the second ramp signal generation circuit is supplied to the first and second AD conversion circuits; and
a switch configured to selectively switch between the first ramp signal and the second ramp signal, and supply the selectively switched ramp signal to the first and second AD conversion circuits,
wherein the switch is configured to, in a case where a temperature of the first ramp signal generation circuit or the second ramp signal generation circuit rises to a predetermined temperature, switch between the first and second ramp signals.

5. The imaging apparatus according to claim 4, wherein the first ramp signal has a gradient different from that of the second ramp signal.

6. The imaging apparatus according to claim 4, wherein power to be supplied to the first ramp signal generation circuit or the second ramp signal generation circuit is reduced according to imaging situation.

* * * * *